US011812483B2

(12) United States Patent
He et al.

(10) Patent No.: US 11,812,483 B2
(45) Date of Patent: Nov. 7, 2023

(54) SUPPORT OF PROPRIETARY FEATURES IN WIRELESS COMMUNICATIONS NETWORKS

(71) Applicant: QUALCOMM Incorporated, San Diego, CA (US)

(72) Inventors: Linhai He, San Diego, CA (US); Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 16/780,901

(22) Filed: Feb. 3, 2020

(65) Prior Publication Data
US 2020/0260508 A1 Aug. 13, 2020

Related U.S. Application Data

(60) Provisional application No. 62/804,702, filed on Feb. 12, 2019.

(51) Int. Cl.
*H04W 76/11* (2018.01)
*H04W 80/02* (2009.01)
(Continued)

(52) U.S. Cl.
CPC ............ *H04W 76/11* (2018.02); *H04W 72/21* (2023.01); *H04W 72/23* (2023.01); *H04W 72/53* (2023.01); *H04W 76/27* (2018.02); *H04W 80/02* (2013.01)

(58) Field of Classification Search
CPC ... H04W 76/11; H04W 72/042; H04W 80/02; H04W 72/0493; H04W 72/14;
(Continued)

(56) References Cited

U.S. PATENT DOCUMENTS

2013/0322413 A1\* 12/2013 Pelletier ................ H04L 5/0091
370/336
2014/0004857 A1\* 1/2014 Rune ..................... H04W 48/12
455/434
(Continued)

OTHER PUBLICATIONS

3GPP TSG RAN WG1 #90bis ; R1-1717665, Source: Samsung, Title: Procedures for UL Transmissions, Prague, CZ, Oct. 9-13, 2017 (Year: 2017).*
(Continued)

*Primary Examiner* — Mohammed S Chowdhury
(74) *Attorney, Agent, or Firm* — Holland & Hart LLP

(57) ABSTRACT

Methods, systems, and devices for wireless communications are described to enable a base station and a user equipment (UE) to identify and respond to communications in accordance with one or more communications services. For example, the base station and the UE may support communications in accordance with a wireless communications standard (e.g., third generation partnership project (3GPP) standard), in addition to supporting an additional communications service including one or more proprietary features. In some cases, the UE may transmit an indication to the base station, or the base station may otherwise determine, that the UE supports the proprietary features. Further, the base station may assign and transmit a unique radio network temporary identifier (RNTI) to the UE for the additional communications service (e.g., a proprietary RNTI). Accordingly, the UE and the base station may identify and use the proprietary RNTI when transmitting, receiving, decoding, and responding to proprietary communications messages.

52 Claims, 24 Drawing Sheets

(51) Int. Cl.
*H04W 76/27* (2018.01)
*H04W 72/21* (2023.01)
*H04W 72/23* (2023.01)
*H04W 72/53* (2023.01)

(58) Field of Classification Search
CPC ... H04W 76/27; H04W 72/1284; H04W 4/38; H04W 4/70; H04W 72/1289; H04W 8/26; H04W 8/24; H04W 72/0466; H04W 72/048; H04W 72/1263; H04W 72/1278; H04W 72/21; H04W 72/23; H04W 72/53; H04W 72/20; H04W 72/51; H04L 69/24
See application file for complete search history.

(56) References Cited

U.S. PATENT DOCUMENTS

| | | | | |
|---|---|---|---|---|
| 2014/0369242 | A1* | 12/2014 | Ng | H04L 5/001 370/280 |
| 2017/0013640 | A1* | 1/2017 | Loehr | H04W 72/1284 |
| 2017/0019882 | A1* | 1/2017 | Nimbalker | H04W 74/02 |
| 2019/0052487 | A1* | 2/2019 | Shelby | H04L 1/0072 |
| 2019/0124669 | A1* | 4/2019 | Luo | H04W 4/44 |
| 2019/0182639 | A1* | 6/2019 | Basu Mallick | H04W 8/24 |
| 2019/0274032 | A1* | 9/2019 | Chatterjee | H04L 5/00 |
| 2019/0306848 | A1* | 10/2019 | Zhou | H04W 72/042 |
| 2020/0145940 | A1* | 5/2020 | Gage | H04W 36/30 |
| 2020/0267803 | A1* | 8/2020 | Kwak | H04L 5/0007 |
| 2020/0359364 | A1* | 11/2020 | Zhu | H04W 72/042 |
| 2020/0383119 | A1* | 12/2020 | Sun | H04L 5/0092 |
| 2021/0153178 | A1* | 5/2021 | Shen | H04W 72/1289 |
| 2021/0168794 | A1* | 6/2021 | Zhang | H04L 5/0044 |

OTHER PUBLICATIONS

3GPP TSG-RAN WG2 Meeting #99bis; R2-1711962; Source: Huawei, HiSilicon, Title: Further discussion on the modelling of grant-free, Prague, Czech Republic, Oct. 9-13, 2017. (Year: 2017).*
International Search Report and Written Opinion—PCT/US2020/016662—ISA/EPO—dated May 29, 2020.
Nokia Corporation, Nokia Siemens Networks: "Allocation of RNTI values", 3GPP TSG-RAN WG2 Meeting #61, R2-080987, 3rd Generation Partnership Project (3GPP), Mobile Competence Centre, 650, Route Des Lucioles, F-06921 Sophia-Antipolis Cedex, France, vol. RAN WG2, No. Sorrento, Ital, Feb. 11-15, 2008, 6 pages.
Qualcomm Incorporated : "SPS for V2V Communication", 3GPP Draft, 3GPP TSG-RAN WG2 Meeting #94, R2-164063 SPS for V2V Communication, 3rd Generation Partnership Project (3GPP), Mobile Competence Centre , 650, Route Des Lucioles , F-06921, Sophia-Antipolis Cedex, France, vol. RAN WG2, No. Nanjing, China, May 23, 2016-May 27, 2016 May 22, 2016 (May 22, 2016), XP051105386, Retrieved from the Internet: URL:http://www.3gpp.org/ftp/Meetings_3GPP_SYNC/RAN2/Docs/ [retrieved on May 22, 2016], 4 pages.

* cited by examiner

SUPPORT OF PROPRIETARY FEATURES IN WIRELESS COMMUNICATIONS NETWORKS

CROSS REFERENCE

The present Application for Patent claims the benefit of U.S. Provisional Patent Application No. 62/804,702 by HE et al., entitled "SUPPORT OF PROPRIETARY COMMUNICATIONS SERVICES IN WIRELESS COMMUNICATIONS NETWORKS," filed Feb. 12, 2019, assigned to the assignee hereof, and which is expressly incorporated by reference herein.

BACKGROUND

The following relates generally to wireless communications, and more specifically to support of proprietary features in wireless communications networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LIE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support proprietary features in wireless communications networks. Generally, the described techniques provide for a base station and a user equipment (UE) to identify and respond to communications in accordance with one or more proprietary features of a communications service. For example, the base station and the UE may support communications in accordance with a wireless communications standard (e.g., standard communications, such as communications according to a third generation partnership project (3GPP) or other standard), in addition to supporting one or more proprietary features of a communications service. In some cases, the UE may transmit an indication to the base station (e.g., via standard communications), indicating that the UE supports the one or more proprietary features. In some cases, the indication may include a capability report for the UE or a UE identifier (ID), where the base station may use the UE ID to look up or otherwise determine whether a UE supports the one or more proprietary features. In some examples, the base station may assign and transmit a unique radio network temporary identifier (RNTI) to the UE for the communications service associated with the one or more proprietary features (e.g., a proprietary RNTI). Accordingly, the UE and the base station may identify and use the proprietary RNTI when transmitting, receiving, decoding, and responding to proprietary communications messages.

For example, the base station may transmit a downlink grant to the UE (e.g., via downlink control information (DCI) or via a semi-persistently scheduled (SPS) grant), where the grant may, in some cases, be addressed to the proprietary RNTI and may indicate a set of resources to be used for proprietary downlink messages. As such, the UE may determine to receive the proprietary downlink messages indicated via the grant, and may decode the messages using the proprietary RNTI. In some cases, the base station may indicate a set of designated control resources reserved for the communications service. In some examples, the UE may determine to transmit an uplink resource request on the designated resources using the proprietary RNTI, and the base station may determine to decode any message on the designated resources (e.g., including the request) using the proprietary RNTI. Accordingly, the base station may respond with an uplink resource grant addressed to the proprietary RNTI of the UE, and the UE may transmit proprietary uplink messages (e.g., scrambled with the proprietary RNTI) using the uplink grant. In some cases, the UE may transmit an uplink resource request using standard resources (e.g., scrambled with a non-proprietary RNTI, such as a cell RNTI (C-RNTI)) and the base station may respond with a standard uplink grant (e.g., addressed to the C-RNTI). In some examples, the UE may transmit one or more uplink messages, using the standard uplink grant. that are proprietary messages (e.g., scrambled with the proprietary RNTI). Further, the base station may determine that an uplink message is proprietary by attempting to decode the message with each RNTI assigned to the UE, where the base station may successfully decode the message with the proprietary RNTI.

A method of wireless communication at a UE that supports communications in accordance with a wireless communications standard is described. The method may include transmitting, to a base station and in accordance with the wireless communications standard, signaling that indicates the UE also supports a communications service including one or more proprietary features, receiving, from the base station, an assignment of a RNTI for the communications service, and communicating with the base station in accordance with the communications service based on the RNTI for the communications service.

An apparatus for wireless communication at a UE that supports communications in accordance with a wireless communications standard is described. The apparatus may include a processor, memory coupled with the processor, and instructions stored in the memory. The instructions may be executable by the processor to cause the apparatus to transmit, to a base station and in accordance with the wireless communications standard, signaling that indicates the UE also supports a communications service including one or more proprietary features, receive, from the base station, an assignment of a RNTI for the communications service, and communicate with the base station in accordance with the communications service based on the RNTI for the communications service.

Another apparatus for wireless communication at a UE that supports communications in accordance with a wireless communications standard is described. The apparatus may include means for transmitting, to a base station and in accordance with the wireless communications standard, signaling that indicates the UE also supports a communications service including one or more proprietary features, receiving, from the base station, an assignment of a RNTI for the communications service, and communicating with the base station in accordance with the communications service based on the RNTI for the communications service.

A non-transitory computer-readable medium storing code for wireless communication at a UE that supports communications in accordance with a wireless communications standard is described. The code may include instructions executable by a processor to transmit, to a base station and in accordance with the wireless communications standard, signaling that indicates the UE also supports a communications service including one or more proprietary features, receive, from the base station, an assignment of a RNTI for the communications service, and communicate with the base station in accordance with the communications service based on the RNTI for the communications service.

Some examples of the method, apparatuses, and non-transitory computer-readable medium described herein may further include operations, features, means, or instructions for receiving, from the base station, a DCI message addressed to the RNTI for the communications service.

In some examples of the method, apparatuses, and non-transitory computer-readable medium described herein, at least one of a format or content of the DCI message may be proprietary.

Some examples of the method, apparatuses, and non-transitory computer-readable medium described herein may further include operations, features, means, or instructions for attempting to decode the DCI message based on a C-RNTI for the UE, decoding the DCI message based on the RNTI for the communications service, and identifying the DCI message as associated with the communications service based on successfully decoding the DCI message based on the RNTI for the communications service.

Some examples of the method, apparatuses, and non-transitory computer-readable medium described herein may further include operations, features, means, or instructions for identifying a shared data channel resource based on the DCI message, receiving, from the base station, a downlink message via the shared data channel resource, and decoding the downlink message based on the RNTI for the communications service.

In some examples of the method, apparatuses, and non-transitory computer-readable medium described herein, the downlink message includes a downlink data transmission for the communications service.

In some examples of the method, apparatuses, and non-transitory computer-readable medium described herein, the downlink message includes a medium access control (MAC) control element (CE) or a radio resource control (RRC) message for the communications service, and where at least one of a format or content of the MAC CE or the RRC message may be proprietary.

Some examples of the method, apparatuses, and non-transitory computer-readable medium described herein may further include operations, features, means, or instructions for receiving, from the base station, a grant of a SPS resource for the communications service, receiving, from the base station, one or more downlink messages via the SPS resource, and decoding the one or more downlink messages based on the RNTI for the communications service.

In some examples of the method, apparatuses, and non-transitory computer-readable medium described herein, the one or more downlink messages include one or more downlink data transmissions for the communications service.

In some examples of the method, apparatuses, and non-transitory computer-readable medium described herein, the one or more downlink messages include at least one of a MAC CE or an RRC message, and where at least one of a format or content of the MAC CE or the RRC message may be proprietary.

Some examples of the method, apparatuses, and non-transitory computer-readable medium described herein may further include operations, features, means, or instructions for receiving, from the base station, an indication of an uplink control channel resource that may be reserved for the communications service, and transmitting, to the base station via the uplink control channel resource, a scheduling request or other type of uplink control information (UCI) message associated with the communications service.

Some examples of the method, apparatuses, and non-transitory computer-readable medium described herein may further include operations, features, means, or instructions for receiving, from the base station in response to transmitting the scheduling request, an uplink grant addressed to the RNTI for the communications service, encoding an uplink message based on the RNTI for the communications service, and transmitting the uplink message to the base station via uplink resources granted by the uplink grant.

In some examples of the method, apparatuses, and non-transitory computer-readable medium described herein, the uplink message includes an uplink data transmission for the communications service.

In some examples of the method, apparatuses, and non-transitory computer-readable medium described herein, the uplink message includes a MAC CE or an RRC message, and where at least one of a format or content of the MAC CE or the RRC message may be proprietary.

In some examples of the method, apparatuses, and non-transitory computer-readable medium described herein, at least one of a format or content of the scheduling request or other type of UCI message may be proprietary.

Some examples of the method, apparatuses, and non-transitory computer-readable medium described herein may further include operations, features, means, or instructions for receiving, from the base station, a configured grant of uplink resources for the communications service, encoding one or more uplink messages based on the RNTI for the communications service, and transmitting the one or more uplink messages to the base station via the uplink resources associated with the configured grant.

In some examples of the method, apparatuses, and non-transitory computer-readable medium described herein, the one or more uplink messages include one or more uplink data transmissions for the communications service.

In some examples of the method, apparatuses, and non-transitory computer-readable medium described herein, the one or more uplink messages include at least one of a MAC CE or an RRC message, and where at least one of a format or content of the MAC CE or the RRC message may be proprietary.

Some examples of the method, apparatuses, and non-transitory computer-readable medium described herein may further include operations, features, means, or instructions for transmitting, to the base station, a scheduling request, receiving, from the base station, a DCI message addressed to a C-RNTI for the UE, where the DCI message includes an uplink grant, encoding an uplink message based on the RNTI for the communications service, and transmitting the uplink message to the base station via uplink resources granted by the uplink grant.

Some examples of the method, apparatuses, and non-transitory computer-readable medium described herein may further include operations, features, means, or instructions for receiving, from the base station, a configured grant of uplink resources, and transmitting, to the base station, a set of uplink messages via the uplink resources associated with the configured grant, where at least a first uplink message of the set may be encoded based on a C-RNTI for the UE and at least a second uplink message of the set may be encoded based on the RNTI for the communications service.

Some examples of the method, apparatuses, and non-transitory computer-readable medium described herein may further include operations, features, means, or instructions for receiving, from the base station, an assignment of a C-RNTI, where the RNTI for the communications service may be distinct from the C-RNTI.

Some examples of the method, apparatuses, and non-transitory computer-readable medium described herein may further include operations, features, means, or instructions for receiving, from the base station, an assignment of one or more additional RNTIs each corresponding to an additional communications service.

In some examples of the method, apparatuses, and non-transitory computer-readable medium described herein, transmitting the signaling that indicates the UE also supports the communications service including one or more proprietary features may include operations, features, means, or instructions for transmitting, to the base station, an indication of an identifier of the UE, capability information for the UE, or any combination thereof.

In some examples of the method, apparatuses, and non-transitory computer-readable medium described herein, the RNTI for the communications service may be specific to the UE.

In some examples of the method, apparatuses, and non-transitory computer-readable medium described herein, the wireless communications standard may be a 3GPP standard.

A method of wireless communication at a base station that supports communications in accordance with a wireless communications standard is described. The method may include establishing communications with a UE in accordance with the wireless communications standard, identifying that the UE also supports a communications service including one or more proprietary features, transmitting, to the UE, an assignment of a RNTI for the communications service, and communicating with the UE in accordance with the communications service based on the RNTI for the communications service.

An apparatus for wireless communication at a base station that supports communications in accordance with a wireless communications standard is described. The apparatus may include a processor, memory coupled with the processor, and instructions stored in the memory. The instructions may be executable by the processor to cause the apparatus to establish communications with a UE in accordance with the wireless communications standard, identify that the UE also supports a communications service including one or more proprietary features, transmit, to the UE, an assignment of a RNTI for the communications service, and communicate with the UE in accordance with the communications service based on the RNTI for the communications service.

Another apparatus for wireless communication at a base station that supports communications in accordance with a wireless communications standard is described. The apparatus may include means for establishing communications with a UE in accordance with the wireless communications standard, identifying that the UE also supports a communications service including one or more proprietary features, transmitting, to the UE, an assignment of a RNTI for the communications service, and communicating with the UE in accordance with the communications service based on the RNTI for the communications service.

A non-transitory computer-readable medium storing code for wireless communication at a base station that supports communications in accordance with a wireless communications standard is described. The code may include instructions executable by a processor to establish communications with a UE in accordance with the wireless communications standard, identify that the UE also supports a communications service including one or more proprietary features, transmit, to the UE, an assignment of a RNTI for the communications service, and communicate with the UE in accordance with the communications service based on the RNTI for the communications service.

Some examples of the method, apparatuses, and non-transitory computer-readable medium described herein may further include operations, features, means, or instructions for transmitting, to the UE, a DCI message addressed to the RNTI for the communications service.

In some examples of the method, apparatuses, and non-transitory computer-readable medium described herein, at least one of a format or content of the DCI message may be proprietary.

Some examples of the method, apparatuses, and non-transitory computer-readable medium described herein may fluffier include operations, features, means, or instructions for encoding a downlink message based on the RNTI for the communications service, and transmitting the downlink message to the UE via a shared data channel resource granted by the DCI message.

In some examples of the method, apparatuses, and non-transitory computer-readable medium described herein, the downlink message includes a downlink data transmission for the communications service.

In some examples of the method, apparatuses, and non-transitory computer-readable medium described herein, the downlink message includes a MAC CE or a RRC message based on the RNTI for the communications service, and where at least one of a format or content of the MAC CE or the RRC message may be proprietary.

Some examples of the method, apparatuses, and non-transitory computer-readable medium described herein may further include operations, features, means, or instructions for transmitting, to the UE, a grant of a SPS resource for the communications service, encoding one or more downlink messages based on the RNTI for the communications service, and transmitting the one or more downlink messages to the UE via the SPS resource.

In some examples of the method, apparatuses, and non-transitory computer-readable medium described herein, the one or more downlink messages include one or more downlink data transmissions for the communications service.

In some examples of the method, apparatuses, and non-transitory computer-readable medium described herein, the one or more downlink messages include at least one of a MAC CE or an RRC message, and where at least one of a format or content of the MAC CE or the RRC message may be proprietary.

Some examples of the method, apparatuses, and non-transitory computer-readable medium described herein may further include operations, features, means, or instructions for transmitting, to the UE, an indication of an uplink control channel resource that may be reserved for the communications service, and receiving, from the UE via the uplink control channel resource, a scheduling request or other type of UCI message associated with the communications service.

Some examples of the method, apparatuses, and non-transitory computer-readable medium described herein may further include operations, features, means, or instructions for transmitting, to the UE in response to receiving the scheduling request, an uplink grant addressed to the RNTI for the communications service, receiving, from the UE, an uplink message via uplink resources granted by the uplink grant, and decoding the uplink message based on the RNTI for the communications service.

In some examples of the method, apparatuses, and non-transitory computer-readable medium described herein, the uplink message includes an uplink data transmission for the communications service.

In some examples of the method, apparatuses, and non-transitory computer-readable medium described herein, the uplink message includes a MAC CE or an RRC message, and where at least one of a format or content of the MAC CE or the RRC message may be proprietary.

In some examples of the method, apparatuses, and non-transitory computer-readable medium described herein, at least one of a format or content of the scheduling request or other type of UCI message may be proprietary.

Some examples of the method, apparatuses, and non-transitory computer-readable medium described herein may fluffier include operations, features, means, or instructions for transmitting, to the UE, a configured grant of uplink resources for the communications service, receiving, from the UE, one or more uplink messages via the uplink resources associated with the configured grant, and decoding the one or more uplink messages based on the RNTI for the communications service.

In some examples of the method, apparatuses, and non-transitory computer-readable medium described herein, the one or more uplink messages include one or more uplink data transmissions for the communications service.

In some examples of the method, apparatuses, and non-transitory computer-readable medium described herein, the one or more uplink messages include at least one of a MAC CE or an RRC message, and where at least one of a format or content of the MAC CE or the RRC message may be proprietary.

Some examples of the method, apparatuses, and non-transitory computer-readable medium described herein may further include operations, features, means, or instructions for receiving, from the UE, a scheduling request, transmitting, to the UE, a DCI message addressed to a C-RNTI for the UE, where the DCI message includes an uplink grant, receiving an uplink message from the UE via uplink resources granted by the uplink grant, and decoding the uplink message based on the RNTI for the communications service.

Some examples of the method, apparatuses, and non-transitory computer-readable medium described herein may fluffier include operations, features, means, or instructions for attempting to decode the uplink message based on the C-RNTI for the UE, and identifying the uplink message as associated with the communications service based on successfully decoding the uplink message based on the RNTI for the communications service.

Some examples of the method, apparatuses, and non-transitory computer-readable medium described herein may further include operations, features, means, or instructions for transmitting, to the UE, a configured grant of uplink resources, receiving, from the UE, a set of uplink messages via the uplink resources associated with the configured grant, decoding at least a first uplink message of the set based on a C-RNTI for the UE, and decoding at least a second uplink message of the set based on the RNTI for the communications service.

Some examples of the method, apparatuses, and non-transitory computer-readable medium described herein may further include operations, features, means, or instructions for attempting to decode each of the set of uplink messages based on the C-RNTI for the UE and based on the RNTI for the communications service, and identifying at least the second uplink message as associated with the communications service based on successfully decoding the second uplink message based on the RNTI for the communications service.

Some examples of the method, apparatuses, and non-transitory computer-readable medium described herein may further include operations, features, means, or instructions for transmitting, to the UE, arm assignment of a C-RNTI, where the RNTI for the communications service may be distinct from the C-RNTI.

Some examples of the method, apparatuses, and non-transitory computer-readable medium described herein may further include operations, features, means, or instructions for transmitting, to the UE, an assignment of one or more additional RNTIs each corresponding to an additional communications service.

In some examples of the method, apparatuses, and non-transitory computer-readable medium described herein, identifying that the UE also supports the communications service including one or more proprietary features may include operations, features, means, or instructions for receiving, from the UE, an indication of an identifier of the UE, and determining, based on the identifier of the UE, that the UE supports the communications service.

In some examples of the method, apparatuses, and non-transitory computer-readable medium described herein, identifying that the UE also supports the communications service including one or more proprietary features may include operations, features, means, or instructions for receiving, from the UE, capability information indicating that the UE also supports the communications service.

In some examples of the method, apparatuses, and non-transitory computer-readable medium described herein, the RNTI for the communications service may be specific to the UE.

DETAILED DESCRIPTION

Figure 1:
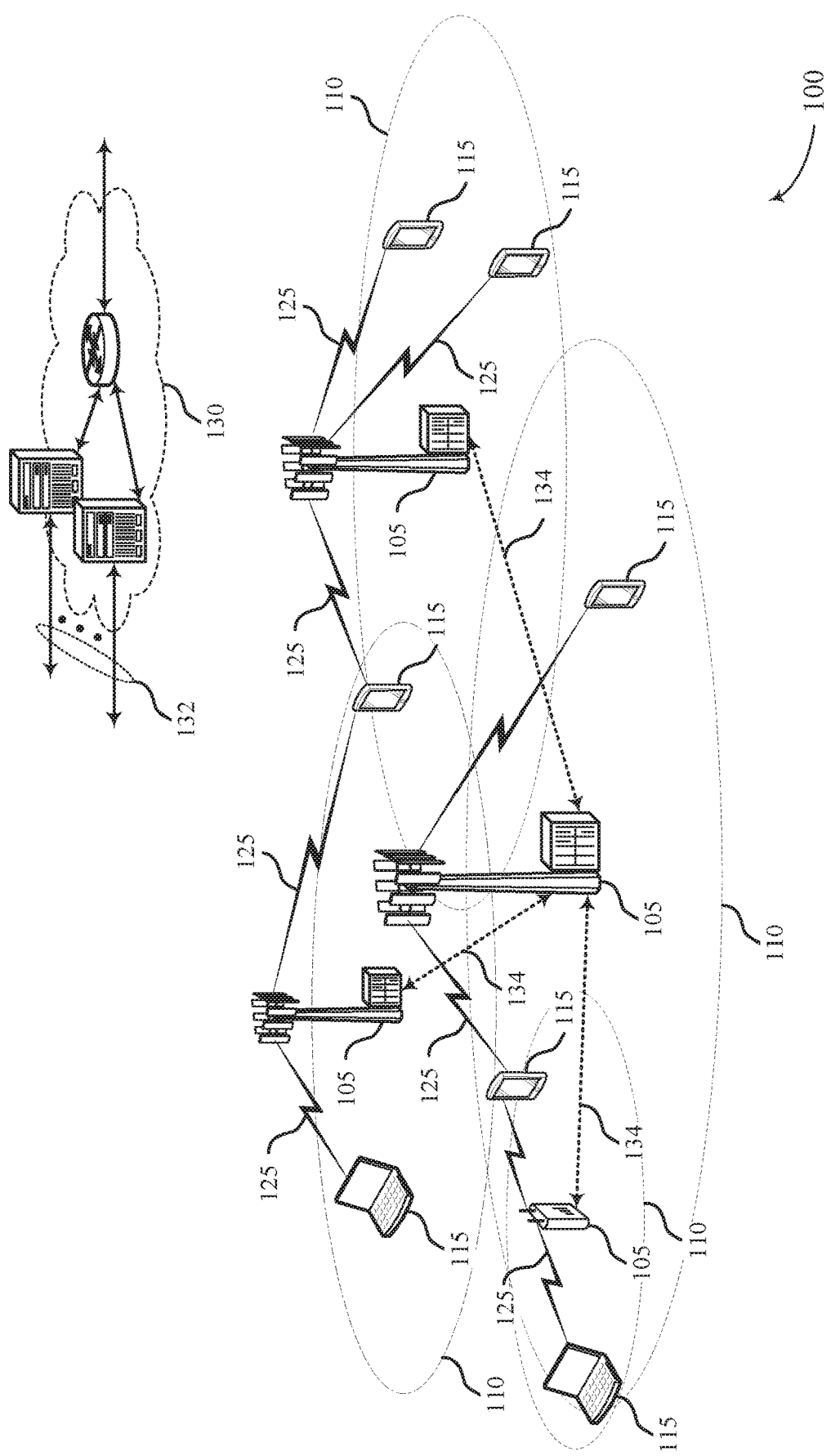
FIG. 1 illustrates an example of a wireless communications system that supports proprietary features in wireless communications networks in accordance with aspects of the present disclosure.

Wireless communications devices operating in a wireless communications network (e.g., a New Radio (NR) network) may support communications in accordance with a wireless communications standard (e.g., a third generation partnership project (3GPP) standard or another standard). For example, a base station and a user equipment (UE) may establish communications and communicate in accordance with a wireless communications standard (e.g., standard communications). In some cases, a UE and a base station may also support communications in accordance with one or more communications services that each include one or more proprietary features. As such, the UE and the base station may communicate via standard communications and exchange information in order to identify and correctly respond to proprietary messages and/or proprietary message formats. Further, the UE and the base station may communicate using a communications service that includes one or more proprietary features based on the information exchanged regarding the proprietary features.

As used herein, proprietary features may include features that are non-compliant with or not required for compliance with (e.g., non-mandatory, optional, etc.) a communications standard (e.g., a 3GPP or another wireless communications standard). For example, a proprietary message may include content or have a format that is proprietary and thus includes a proprietary feature. As described herein, a proprietary message or transmission may include a transmission whose content and/or format is proprietary. A communications service that includes proprietary features may be any communications service (e.g., set of protocols, procedures, or functionalities for communications) that includes one or more proprietary features. For example, a base station, a UE, or any other aspect of a wireless communications network may support a communications standard, such as NR, and may additionally support one or more communications services that include proprietary features. While a feature may be proprietary, aspects of a wireless communications service related to the support of proprietary features may be standardized (e.g., a standard may specify one or more functionalities that provide a platform for or otherwise facilitate the use of proprietary features in addition to standardized features).

In some examples of standardized or otherwise implemented support for proprietary features, after establishing a standard communications link with a base station, a UE may transmit an indication (e.g., in a standard message) to the base station indicating that the UE supports a communications service that includes one or more proprietary features. In some cases, the indication may include one or more of an identifier (ID) unique to the UE or UE capability information (e.g., indicating that the UE is capable of a particular type or types of proprietary features). For example, the indication may be included in any message that includes a UE ID, such as a random access message, a handover message, or other type of message. If the base station receives an ID from the UE (e.g., as opposed to capability information), the base station may determine whether the UE is capable of proprietary features by matching the ID with a corresponding ID from a list, table, or index of IDs indicating UE capabilities for proprietary features.

After determining that the UE supports the proprietary features, the base station may assign a unique radio network temporary identifier (RNTI) to the UE, where the RNTI may correspond to the proprietary communications service that includes the proprietary features (e.g., a proprietary RNTI or a proprietary features RNTI (PF-RNTI)). The proprietary RNTI may be specific (dedicated, unique) to the UE or to a group of UEs. In some cases, the UE may support more than one communications service that includes proprietary features, and the base station may assign more than one proprietary RNTI to the UE (e.g., at least one proprietary RNTI for each communications service). In some examples, the base station may transmit the proprietary RNTI to the UE, such that the UE may use the proprietary RNTI to scramble and/or decode proprietary transmissions to and from the base station, respectively. Various forms of proprietary transmissions (e.g., proprietary features) are possible, and several non-exhaustive examples of proprietary transmissions are given below.

In one example, the base station may transmit a proprietary downlink control information (DCI) message to the UE, addressed to the proprietary RNTI. In some cases, the UE may attempt to decode the DCI message (e.g., via a blind decoding process) using both a cell RNTI (C-RNTI) (e.g., used for standard communications) and the proprietary RNTI. In some cases, the UE may successfully decode the DCI message using the proprietary RNTI, and may therefore determine that the DCI message is proprietary and is addressed to the proprietary RNTI. In some cases, the DCI message may include information regarding one or more proprietary downlink messages, as well as resource grants (e.g., time resources, frequency resources, code resources) for the one or more downlink messages.

In some examples, instead of transmitting a DCI with a dynamic resource grant, the base station may transmit a grant for semi-persistently scheduled (SPS) resources to the UE, where the base station may indicate that the SPS resource is to include one or more proprietary downlink messages addressed to the proprietary RNTI. In the case of both types of downlink grants, the base station may transmit the one or more proprietary downlink messages to the UE (e.g., using the corresponding grant), and the UE may decode the messages using the corresponding proprietary RNTI.

In another example, the base station may indicate, to the UE, control resources that are designated for proprietary scheduling requests or other uplink control information (UCI) related to the communications service including proprietary features. Accordingly, the UE may transmit a proprietary UCI or uplink scheduling request to the base station on the designated resources. In some cases, the base station may determine that any scheduling request received over the designated resources may be associated with the communications service including proprietary features. As such, the base station may determine to decode the scheduling request using the proprietary RNTI assigned to the UE. After decoding the scheduling request, the base station may transmit a proprietary uplink grant (e.g., including resources for uplink transmissions) to the UE, addressed to the proprietary RNTI. In some examples, the UE may decode the uplink grant using the proprietary RNTI and may transmit, to the base station, one or more proprietary uplink messages (e.g., scrambled with the proprietary RNTI) using the resources indicated in the grant. The base station may receive the proprietary uplink messages on the indicated resources and decode the uplink messages using the proprietary RNTI.

In a further example, the UE may transmit a non-proprietary or standard. UCI or uplink scheduling request to the base station using standard resources (e.g., scrambled with the C-RNTI of the UE). In some cases, the base station may receive the scheduling request and respond to the UE with an uplink grant sent on standard (e.g., non-proprietary) resources (e.g., a standard DCI message), addressed to the C-RNTI. The UE may receive and decode the uplink grant, and may transmit one or more uplink messages on the indicated resources, where the UE may or may not scramble transmissions using the proprietary RNTI. Accordingly, the base station may receive the one or more uplink messages and may attempt to decode the messages using the C-RNTI and any proprietary RNTI corresponding to the UE. In some cases, the base station may determine that one or more of the uplink messages are proprietary if the message(s) are decodable using the corresponding proprietary RNTI. The base station may respond to the one or more proprietary messages with proprietary downlink transmissions.

Aspects of the disclosure are initially described in the context of a wireless communications systems. Aspects of the disclosure are further illustrated by and described with reference to proprietary downlink and uplink communications, a resource schedule, a process, process flows diagrams, apparatus diagrams, system diagrams, and flowcharts that relate to support of proprietary features in wireless communications networks.

FIG. 1 illustrates an example of a wireless communications system 100 that supports proprietary features in wireless communications networks in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area. 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive bean) directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications networks (e.g., an NR network), wireless devices may be configured to support communications in accordance with a wireless communications standard (e.g., a 3GPP or another wireless communications standard). Additionally, one or more devices (e.g., a UE 115 and a base station 105) may be configured to support communications in accordance with a communications service that includes one or more proprietary features.

For example, a base station 105, a UE 115, or any other aspect of a wireless communications network may support a communications standard (e.g., standard network), such as NR, and may additionally support one or more communications services that include proprietary features. In some cases, each supported communications service, or network resources allocated thereto (e.g., dedicated or otherwise available thereto), may be referred to as a network slice. A wireless communications system may include any number of network slices corresponding to any number of communications services. A communications service may correspond to one network slice, or may correspond to multiple different network slices. Additionally, a proprietary feature of a communications service may maintain a compatibility with the standard network (e.g., where the two services may be employed in parallel) in order to utilize network functions and build on standard network features. While a feature may be proprietary, aspects of a wireless communications service related to the support of proprietary features may be standardized (e.g., a standard may specify one or more functionalities that provide a platform for or otherwise facilitate the use of proprietary features in addition to standardized features).

For example, a communications service that includes proprietary features may support one or more use aspects such as data streaming, MTC applications (e.g., autonomous driving, manufacturing), preferential data traffic for a website, etc. In some cases, the implementation of proprietary features in a communications service may allow a feature or service to be deployed sooner than a standards-based service or feature. Additionally, a communications service that includes proprietary features may target and achieve a quality of service (QoS), such as a data throughput rate or a reliability, that may be different from the standard communications service. In one example, a communications service that includes proprietary features may be company-specific, where the company may target a specific use case or a QoS with the communications service. For example, a company maintaining a website may target a reliability goal using a communications service that includes proprietary features (e.g., such that data to and from the website is not dropped). In another example, a company streaming data (e.g., video, music, etc.) may target a certain combination of throughput and reliability using a communications service that includes proprietary features (e.g., such that the data stream meets a defined quality and speed for an end user).

In one example, a company may maintain a private network of interconnected devices using a communications service that includes proprietary features. In some cases, such a company may be a manufacturing company (e.g., employing industrial IoT devices, using interconnected devices for industrial control, etc.). As such, the interconnected devices (e.g., UEs 115) communicating using the communications service may include robots, sensors, etc. that may be used to automate production and prevent accidents. It is to be understood that these and other examples, including specific use cases, are non-limiting.

Other uses cases are possible, and aspects described in the context of one use case may be combined with one or more other use cases.

A base station 105 and a UE 115 may communicate using both standard communications and proprietary features (e.g., proprietary communications). Accordingly, the base station 105 and the UE 115 may implement methods to identify and respond to proprietary features. For example, the base station 105 and the UE 115 may establish communications using a standard network and the UE 115 may transmit an indication (e.g., via standard communications) to the base station 105 that the UE 115 supports one or more communication services and corresponding proprietary features. In some cases, the base station 105 may assign and transmit (e.g., via standard communications) a proprietary RNTI (e.g., PF-RNTI) to the UE 115. Following a successful assignment of the proprietary RNTI, the base station 105 and the UE 115 may scramble and/or decode proprietary features (e.g., proprietary data or control messages) using the proprietary RNTI. As such, the UE 115 or the base station 105 may determine that a message has a proprietary content and/or format if the message is based on the proprietary RNTI, and the base station 105 or the UE 115 may respond with a similar proprietary message.

In some cases, the base station 105 may transmit a downlink grant to the UE 115 (e.g., via DCI or via an SPS grant), where the grant may, in some cases, be addressed to the proprietary RNTI and may indicate a set of resources to be used for proprietary downlink messages. As such, the UE 115 may determine to receive the proprietary downlink messages on the indicated grant, and decode the messages using the proprietary RNTI. In some cases, the base station 105 may indicate a set of designated uplink control resources that the UE 115 may use for requesting an uplink resource grant for proprietary uplink messages. The UE 115 may determine to transmit an uplink resource request on the designated resources using the proprietary RNTI, and the base station 105 may determine to decode any message on the designated resources (e.g., including the request) using the proprietary RNTI. Accordingly, the base station 105 may respond with an uplink grant addressed to the proprietary RNTI of the UE 115, and the UE 115 may transmit one or more proprietary uplink messages using the uplink grant. In some cases, the UE 115 may transmit an uplink grant request using standard resources (e.g., scrambled with a non-proprietary RNTI) and the base station may respond with a standard uplink grant (e.g., addressed to the non-proprietary RNTI). In some examples, the UE 115 may transmit one or more uplink messages on the grant that are proprietary messages (e.g., scrambled with the proprietary RNTI). Further, the base station 105 may determine that an uplink message is proprietary by attempting to decode the message with each RNTI assigned to the UE 115, where the base station may successfully decode the proprietary message with the proprietary RNTI.

Figure 2:
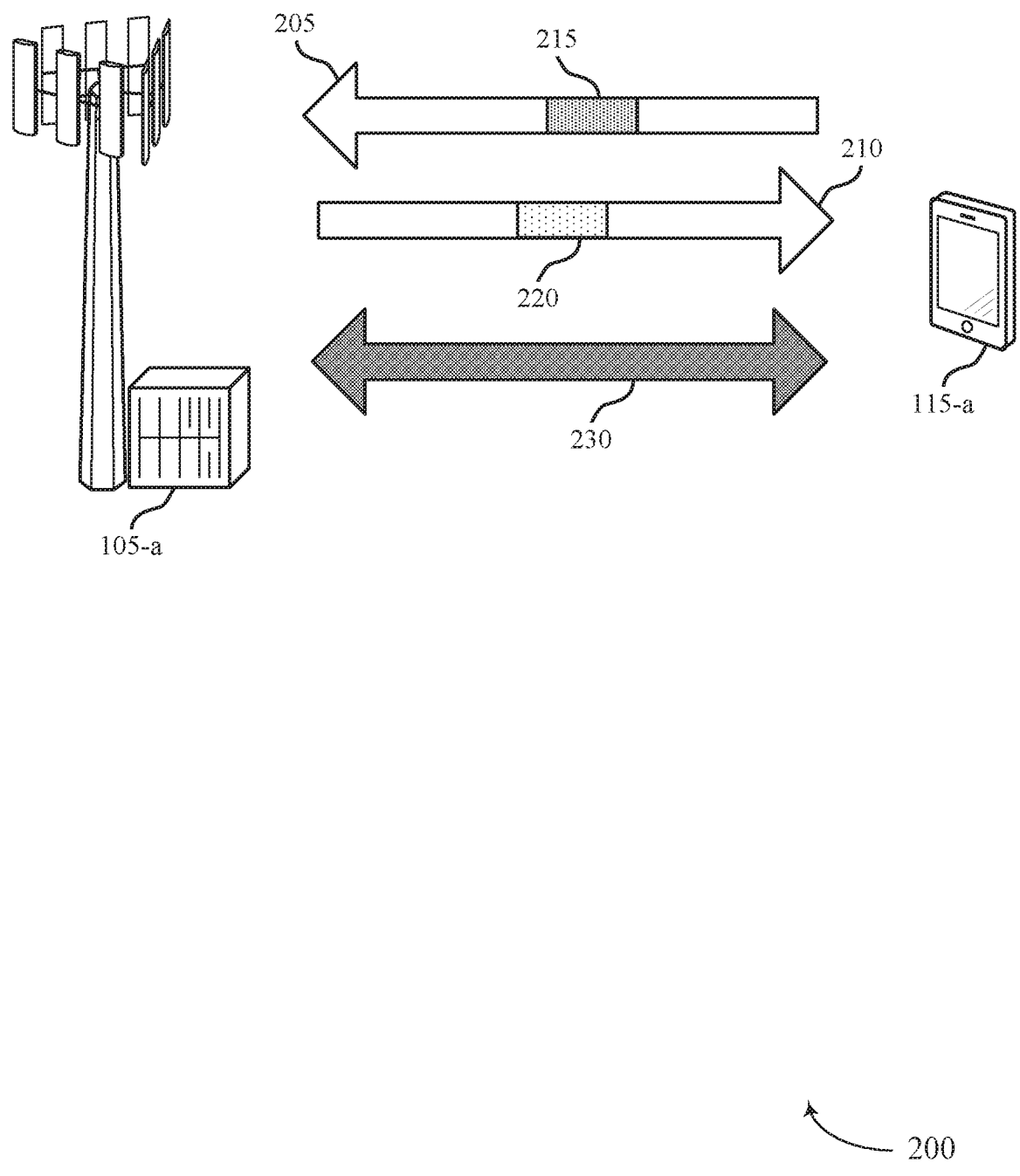
FIG. 2 illustrates an example of a wireless communications system that supports proprietary features in wireless communications networks in accordance with aspects of the present disclosure.

FIG. 2 illustrates an example of a wireless communications system 200 that supports proprietary features in wireless communications networks in accordance with aspects of the present disclosure. In some examples, wireless communications system 200 may implement aspects of wireless communication system 100 and may include a UE 115-*a* and a base station 105-*a*, which may be examples of a UE 115 and a base station 105 described with reference to FIG. 1. In some cases, UE 115-*a* and base station 105-*a* may establish a communications link over a standard network, may exchange information regarding proprietary features and associated communications services, and may begin communications.

For example, UE 115-*a* may transmit a proprietary feature indication 215 to base station 105-*a* as a part of standard uplink communications 205. Upon receiving proprietary feature indication 215, base station 105-*a* may assign a unique proprietary RNTI for UE 115-*a* to use when communicating using proprietary features. In some cases, base station 105-*a* may assign the proprietary RNTI to UE 115-*a* via a proprietary RNTI message 220 sent over standard downlink communications 210 (e.g., via dedicated RRC signaling). In some examples, base station 105-*a* may assign a proprietary RNTI to UE 115-*a* for each communications service that includes proprietary features and is associated with UE 115-*a* (e.g., base station 105-*a* may assign more than one proprietary RNTI to UE 115-*a*). In some cases, a proprietary RNTI may be unique among all UEs 115 using the same communications services or may be unique among all UEs 115 within the network. Following the exchange of proprietary features information and proprietary RNTI information, base station 105-*a* and UE 115-*a* may communicate using proprietary communications 230.

In some cases, proprietary feature indication 215 may be a direct indication (e.g., via a capability reporting feature) of one or more proprietary features supported by the capabilities of UE 115-*a*. Additionally or alternatively, proprietary feature indication 215 may include a UE ID (e.g., UE-ID or any other unique to UE 115-*a*) which base station 105-*a* may use to look up one or more proprietary features supported by UE 115-*a*. Proprietary feature indication 215 may therefore be or be included in any message that includes a UE-ID, such as a random access message, a handover message, or other type of message. In some examples, base station 105-*a* may have access to a list of proprietary features supported by all UEs 115 within a defined network (e.g., all UEs within a physical location or all UEs associated with a same owner), which base station 105-*a* may use to look up features supported by UE 115-*a*. For example, a manufacturer may use a group of UEs 115 for manufacturing purposes and may maintain a list of the group of UEs 115 and corresponding proprietary features, where the list may be accessible to a base station 105. In some cases, UE 115-*a* may transmit proprietary feature indication 215 via RRC signaling (e.g., after establishing a communications link with base station 105-*a*).

When communicating using proprietary communications 230, base station 105-*a* may transmit proprietary DCI to UE 115-*a* (e.g., via a physical downlink control channel (PDCCH)) by addressing a PDCCH to the corresponding assigned proprietary RNTI. Additionally or alternatively, base station 105-*a* may transmit proprietary MAC CEs or RRC messages to UE 115-*a* via proprietary communications 230, where the MAC CEs or RRC messages may be addressed to the corresponding assigned proprietary RNTI. In some cases, either or both of the format and content of the DCI, MAC CEs, and/or RRC messages may be proprietary. Additionally, base station 105-*a* may transmit proprietary downlink communications (e.g., MAC CEs or RRC messages) to UE 115-*a* over dynamically assigned or over SPS resources. When receiving messages over the SPS resources assigned to a communication service that includes proprietary features, UE 115-*a* may be configured to not expect to receive proprietary messages that do not use the corresponding proprietary RNTI.

In some examples of proprietary communications 230, base station 105-*a* may monitor designated physical uplink control channel (PUCCH) resources (e.g., time resources, frequency resources, code resources, etc.) for a proprietary scheduling request (e.g., a request for proprietary MAC CEs) or other type of proprietary UCI sent by UE 115-*a*. In some examples, either or both of the format and content of the scheduling request or UCI may be proprietary. In some cases, UE 115-*a* may transmit the proprietary scheduling request or proprietary UCI over the designated PUCCH resources, base station 105-*a* may receive the information over the designated PUCCH resources, base station 105-*a* may provide an uplink grant addressed to the corresponding proprietary RNTI, and UE 115-*a* may transmit the proprietary messages (e.g., MAC CEs or RRC messages) scrambled by the corresponding proprietary RNTI. When assigning an uplink grant to UE 115-*a*, base station 105-*a* may configure either of a type-1 or a type-2 grant, where base station 105-*a* may specify that UE 115-*a* use the corresponding proprietary RNTI when transmitting using the grant.

Additionally or alternatively, base station 105-*a* may monitor standard PUCCH resources for a proprietary scheduling request from UE 115-*a*. In some cases, UE 115-*a* may transmit the scheduling request using the standard PUCCH resources, and base station 105-*a* may respond with an uplink grant assigned using a standard DCI (e.g., addressed to the C-RNTI of UE 115-*a*). Upon reception of the uplink grant, UE 115-*a* may scramble any proprietary messages associated with the grant with the corresponding proprietary RNTI. In some examples, UE 115-*a* may include standard messages in the uplink grant, which UE 115-*a* may scramble using a C-RNTI. Upon receiving the uplink messages, base station 105-*a* may try to decode the messages in the transport block using each of the RNTIs assigned to UE 115-*a* (e.g., a C-RNTI and one or more proprietary RNTIs, through a blind decode process). Accordingly, base station 105-*a* may determine that a message is a proprietary message, and may determine which proprietary feature the message may correspond to, based on an RNTI that can successfully decode the message. Therefore, base station 105-*a* may determine which of the proprietary messages to parse or process based on the results of the decoding.

Figure 3A:
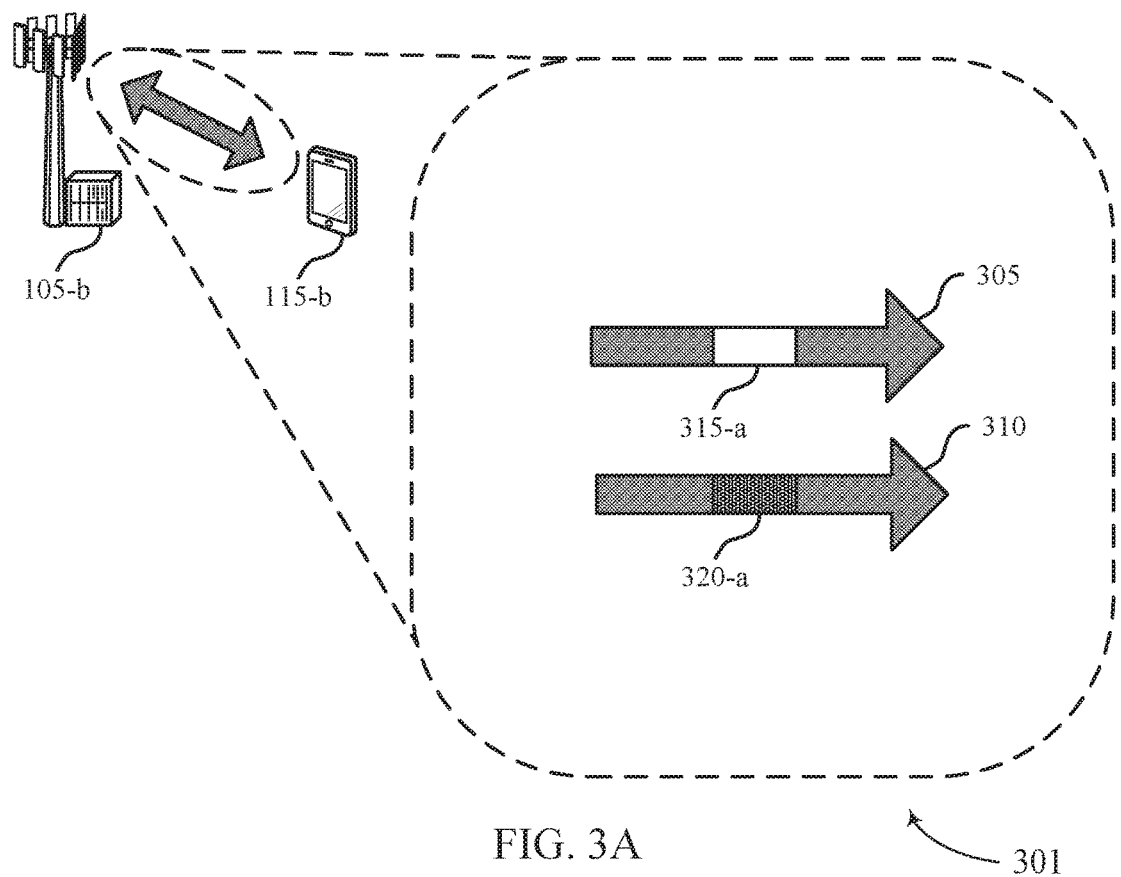
FIGS. 3A and 3B illustrate examples of proprietary downlink communications that support proprietary features in wireless communications networks in accordance with aspects of the present disclosure.

FIG. 3A illustrates an example of proprietary downlink communications 301 that support proprietary features in wireless communications networks in accordance with aspects of the present disclosure. In some examples, proprietary downlink communications 301 may be implemented by aspects of wireless communications systems 100 or 200, such as by a UE 115-*b* and a base station 105-*b*, which may be examples of a UE 115 and a base station 105 described with reference to FIGS. 1 and 2. As described with reference to FIGS. 1 and 2, UE 115-*b* and base station 105-*b* may establish a link over a standard network, may concurrently or subsequently exchange information regarding proprietary features (e.g., assign a proprietary RNTI to UE 115-*b*), and may begin proprietary downlink communications 301.

In some examples, base station 105-*b* may schedule downlink transmissions by transmitting a proprietary DCI 315-*a* to UE 115-*b* via a PDCCH 305, where DCI 315-*a* may be addressed to a proprietary RNTI assigned to UE 115-*b*. After receiving DCI 315-*a*, UE 115-*b* may attempt to decode DCI 315-*a* using both a C-RNTI and any assigned proprietary RNTIs (e.g., through a blind decode process). In some cases, UE 115-*b* may successfully decode DCI 315-*a* using the proprietary RNTI to which DCI 315-*a* is addressed and may therefore determine that a content and/or a format of DCI 315-*a* is proprietary. Additionally, UE 115-*b* may determine a type of proprietary message (e.g., a proprietary format or content) corresponding to DCI 315-*a* based on the proprietary RNTI that successfully decodes DCI 315-*a*. In some cases, UE 115-*b* may receive scheduling information for one or more future proprietary downlink messages 320-*a* via DCI 315-*a*.

In some cases, base station 105-*b* may transmit one or more proprietary downlink messages 320-*a* to UE 115-*b* over a dynamically-assigned proprietary physical downlink shared channel (PDSCH) 310. As such, the transport block containing the one or more proprietary downlink messages 320-*a* may be addressed to the proprietary RNTI associated with DCI 315-*a*. In some examples, the one or more proprietary downlink messages 320-*a* may include one or more proprietary MAC CEs and/or proprietary RRC messages, where a content and/or a format of the MAC CEs and RRC messages may be proprietary. In some cases, UE 115-*b* may successfully decode proprietary downlink messages 320-*a* using the corresponding proprietary RNTI.

Figure 3B:
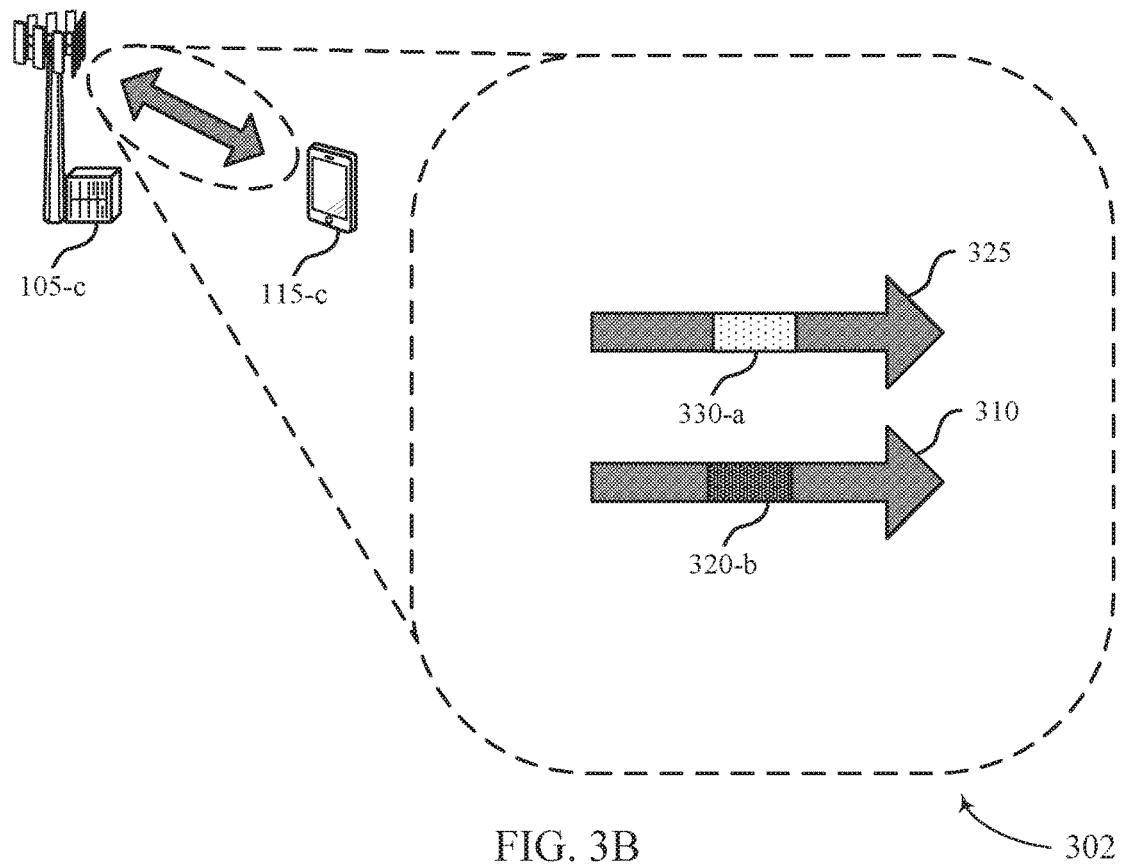

FIG. 3B illustrates an example of proprietary downlink communications 302 that support proprietary features in wireless communications networks in accordance with aspects of the present disclosure. In some examples, proprietary downlink communications 302 may be implemented by aspects of wireless communications systems 100 or 200, such as by a UE 115-*c* and a base station 105-*c*, which may be examples of a UE 115 and a base station 105 described with reference to FIGS. 1 and 2. As described with reference to FIGS. 1 and 2, UE 115-*c* and base station 105-*c* may establish a link over a standard network, may concurrently or subsequently exchange information regarding proprietary services (e.g., assign a proprietary RNTI to UE 115-*c*), and may begin proprietary downlink communications 302.

In some examples, base station 105-*c* may transmit an SPS configuration 330-*a* to UE 115-*c* via RRC signaling 325, where RRC signaling 325 may be addressed to a proprietary RNTI assigned to UE 115-*c* or to a standard C-RNTI assigned to UE 115-*c*. In some examples, UE 115-*c* may decode SPS configuration 330-*a* using a C-RNTI or a corresponding proprietary RNTI. In some cases, SPS configuration 330-*a* may indicate a proprietary RNTI to use for one or more following downlink messages 330320-*b* (e.g., in the case that SPS configuration 330-*a* is scrambled using the C-RNTI). After receiving SPS configuration 330-*a*, UE 115-*c* may attempt to decode SPS configuration 330-*a* using both a C-RNTI and any assigned proprietary RNTIs. In some cases, UE 115-*c* may successfully decode proprietary SPS configuration 330-*a* using the proprietary RNTI to which SPS configuration 330-*a* is addressed, may determine that a content and/or a format of SPS configuration 330-*a* is proprietary, and may additionally determine a proprietary communication feature to which the SPS configuration 330-*a* is addressed. In some cases, UE 115-*b* may receive scheduling information for one or more future proprietary downlink messages 320-*b* via SPS configuration 330-*a*.

Additionally or alternatively, UE 115-*c* may successfully decode SPS configuration 330-*a* using a C-RNTI. As such, UE 115-*c* may determine that SPS configuration 330-*a* is not proprietary. In some cases, UE 115-*b* may receive scheduling information for one or more future proprietary downlink messages 320-*b* via SPS configuration 330-*a*, which may include information regarding a proprietary RNTI assigned to UE 115-*c* and to which proprietary downlink messages 320-*b* may be addressed.

In some cases, base station 105-*c* may transmit one or more proprietary downlink messages 320-*b* to UE 115-*c* over an SPS PDSCH 310. In some cases, UE 115-*c* may not be configured to receive proprietary downlink messages 320-*b* over an SPS PDSCH 310 if the downlink messages are not scrambled with a proprietary RNTI. As such, the transport block containing the one or more proprietary downlink messages 320-*b* may be addressed to the proprietary RNTI indicated by SPS configuration 330-*a*. In some examples, the one or more proprietary downlink messages 320-*b* may include one or more proprietary MAC CEs and/or proprietary RRC messages, where a content and/or a format of the MAC CEs and RRC messages may be proprietary. In some examples, UE 115-*c* may successfully decode proprietary downlink messages 320-*b* using the corresponding proprietary RNTI.

Figure 4A:
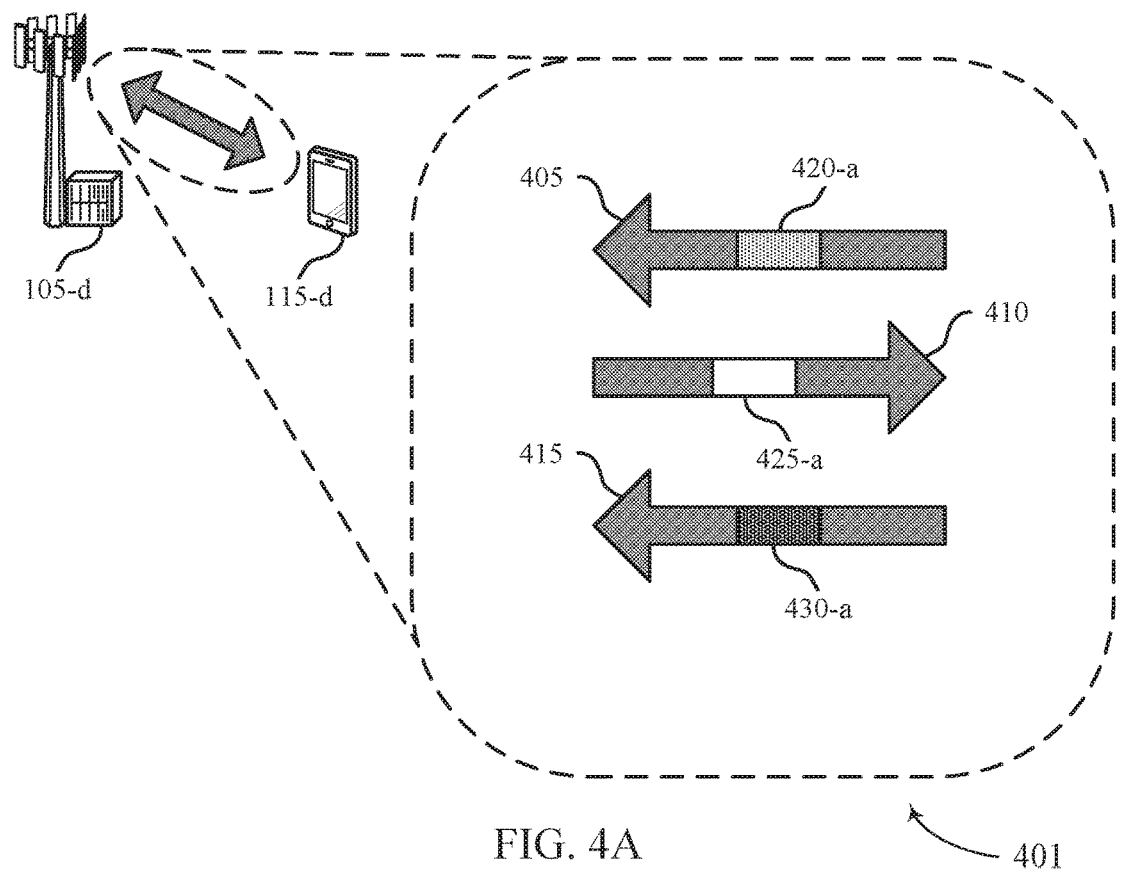
FIGS. 4A and 4B illustrate examples of proprietary uplink communications that support proprietary features in wireless communications networks in accordance with aspects of the present disclosure.

FIG. 4A illustrates an example of proprietary uplink communications 401 that support proprietary features in wireless communications networks in accordance with aspects of the present disclosure. In some examples, proprietary uplink communications 401 may be implemented by aspects of wireless communications systems 100 or 200, such as a UE 115-*d* and a base station 105-*d*, which may be examples of a UE 115 and a base station 105 described with reference to FIGS. 1-3. As described with reference to FIGS. 1 and 2, UE 115-*d* and base station 105-*d* may establish a link over a standard network, may concurrently or subsequently exchange information regarding proprietary services (e.g., assign a proprietary RNTI to UE 115-*d*), and may begin proprietary uplink communications 401.

In some cases, the wireless network may configure designated PUCCH resources for proprietary scheduling requests or other proprietary UCIs supported by UEs 115 within the network. For example, the network may configure one or more resource locations (e.g., in time and frequency), which UE 115-*d* may use to transmit proprietary uplink resource requests. As such, if base station 105-*d* receives an uplink resource request in the one or more resource locations, base station 105-*d* may determine to address an uplink resource grant to the proprietary RNTI corresponding to the resource location. In one example, UE 115-*d* may transmit a proprietary uplink scheduling request 420-*a* (e.g., proprietary UCI) to base station 105-*d* over the PUCCH resources corresponding to the proprietary feature, in order to request resources for a proprietary uplink data transmission (e.g., proprietary MAC CEs or RRC messages).

Upon receiving proprietary uplink scheduling request 420-*a*, base station 105-*d* may transmit a proprietary uplink grant 425-*a* to UE 115-*d* over a PDCCH 410 and addressed to the corresponding proprietary RNTI associated with UE 115-*d*. In some cases, UE 115-*d* may transmit one or more proprietary uplink messages 430-*a* (e.g., proprietary MAC CEs or RRC messages), scrambled by the proprietary RNTI, in the transport block (e.g., proprietary uplink resources 415) indicated by proprietary uplink grant 425-*a*. In some examples, proprietary uplink messages 430-*a* may have a proprietary format and/or content. Moreover, base station 105-*d* may configure either a type-1 or type-2 uplink grant for UE 115-*d* to transmit proprietary uplink messages 430-*a*. In some examples, the type-1 grant may include uplink resources activated when the uplink resources are configured by the network. In other examples, a type-2 grant may include semi-persistent uplink resources configured by base station 105-*d* (e.g., via RRC signaling to UE 115-*d*), where base station 105-*d* may transmit an additional signal to UE 115-*d* to activate the uplink resources. In the case of either a type-1 or a type-2 grant, base station 105-*d* may specify to use a proprietary RNTI in a physical uplink shared channel (PUCCH) configuration (e.g., instead of a C-RNTI). Accordingly, UE 115-*d* may transmit proprietary uplink messages 430-*a* over the configured grants using the proprietary RNTI.

Figure 4B:
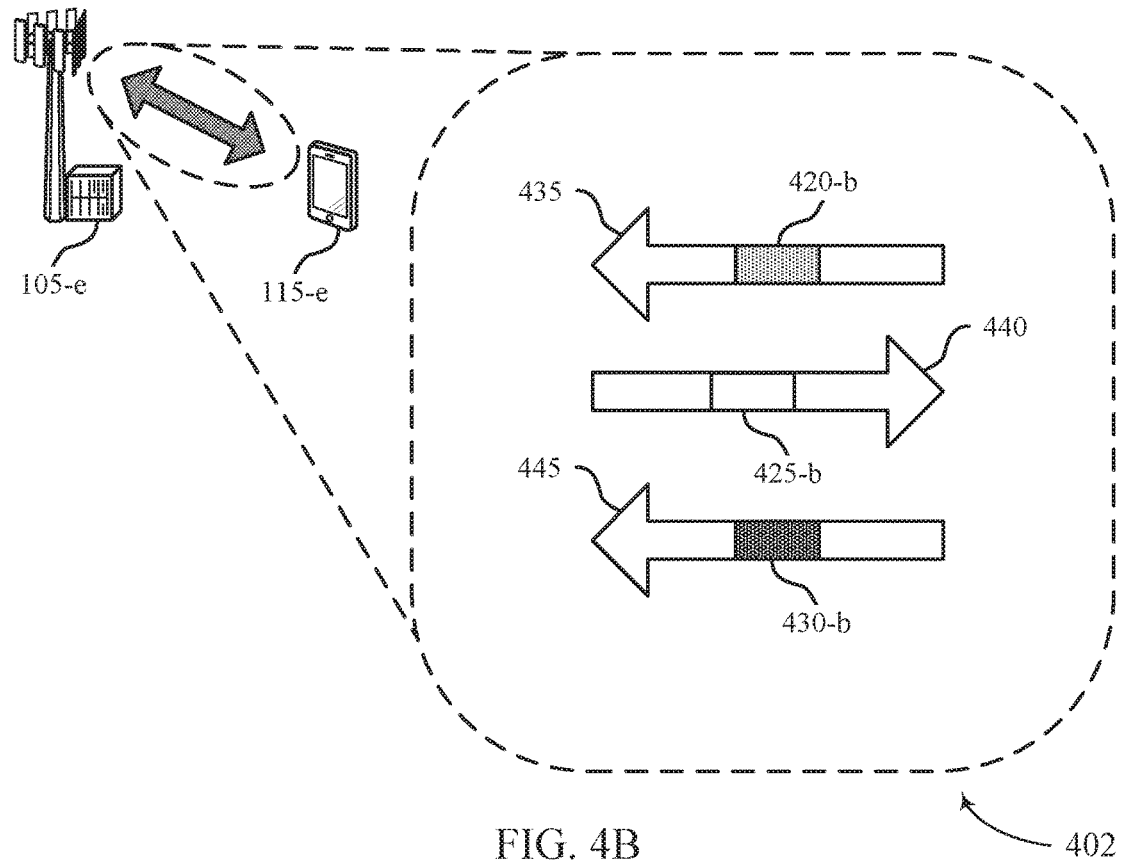

FIG. 4B illustrates an example of proprietary uplink communications 402 that support proprietary features in wireless communications networks in accordance with aspects of the present disclosure. In some examples, proprietary uplink communications 402 may be implemented by aspects of wireless communications systems 100 or 200, such as a UE 115-*e* and a base station 105-*e*, which may be examples of a UE 115 and a base station 105 described with reference to FIGS. 1-3. As described with reference to FIGS. 1 and 2, UE 115-*e* and base station 105-*e* may establish a link over a standard network, may concurrently or subsequently exchange information regarding proprietary services (e.g., assign a proprietary RNTI to UE 115-*e*), and may begin proprietary uplink communications 402.

In some cases, UE 115-*e* may transmit a proprietary uplink scheduling request 420-*b* to base station 105-*e* over standard PUCCH resources 435. After receiving proprietary uplink scheduling request 420-*b*, base station 105-*e* may respond with standard DCI (e.g., addressed to the C-RNTI of UE 115-*e*) on a standard PDCCH 440, where the DCI may include a proprietary uplink grant 425-*b*. In some examples, UE 115-*e* may transmit one or more proprietary uplink messages to base station 105-*e*, and may scramble any transport blocks (e.g., on uplink resources 445) containing proprietary uplink messages 430-*b* using a corresponding proprietary RNTI from a set of one or more proprietary RNTIs assigned to UE 115-*e*. As described with reference to FIGS. 1 and 2, the format and/or content of proprietary uplink messages 430-*b* may be proprietary.

In some cases, base station 105-*e* may attempt to decode the transport blocks using all of the RNTIs (e.g., a C-RNTI and any proprietary RNTIs) assigned to UE 115-*e*. An example decoding process is further described with respect to FIG. 6. In some examples, base station 105-*e* may successfully decode proprietary uplink messages 430-*b* with the corresponding proprietary RNTI, and may therefore determine that the data packets in proprietary uplink messages 430-*b* are associated with a corresponding proprietary communication feature. Accordingly, base station 105-*e* may process proprietary uplink messages 430-*b* according to proprietary methods and the proprietary RNTI associated with proprietary uplink messages 430-*b*.

In other cases, UE 115-*e* and base station 105-*e* may communicate on the uplink using configured grants, (e.g., instead of dynamically assigning grants). In some examples, a same uplink grant may be used for both standard uplink messages and proprietary uplink messages 430-*b*. As described herein, UE 115-*e* may receive grant information from base station 105-*e* (e.g., in proprietary uplink grant 425-*b*) and may transmit proprietary uplink messages 430-*b* over the uplink resources 445 indicated in the grant message. In some cases, UE 115-*e* may scramble any transport blocks containing proprietary uplink messages 430-*b* using the corresponding proprietary RNTI and transmit proprietary uplink messages 430-*b* using uplink resources 445. As described herein, base station 105-*e* may attempt to decode the transport blocks using all of the RNTIs (e.g., a C-RNTI and any proprietary RNTIs) assigned to UE 115-*e* and may determine that proprietary uplink messages 430-*b* correspond to a given RNTI (e.g., a proprietary RNTI) after a successful decoding attempt. Accordingly, base station 105-*e* may process proprietary uplink messages 430-*b* according to the proprietary methods and proprietary RNTI associated with proprietary uplink messages 430-*b*.

Figure 5:
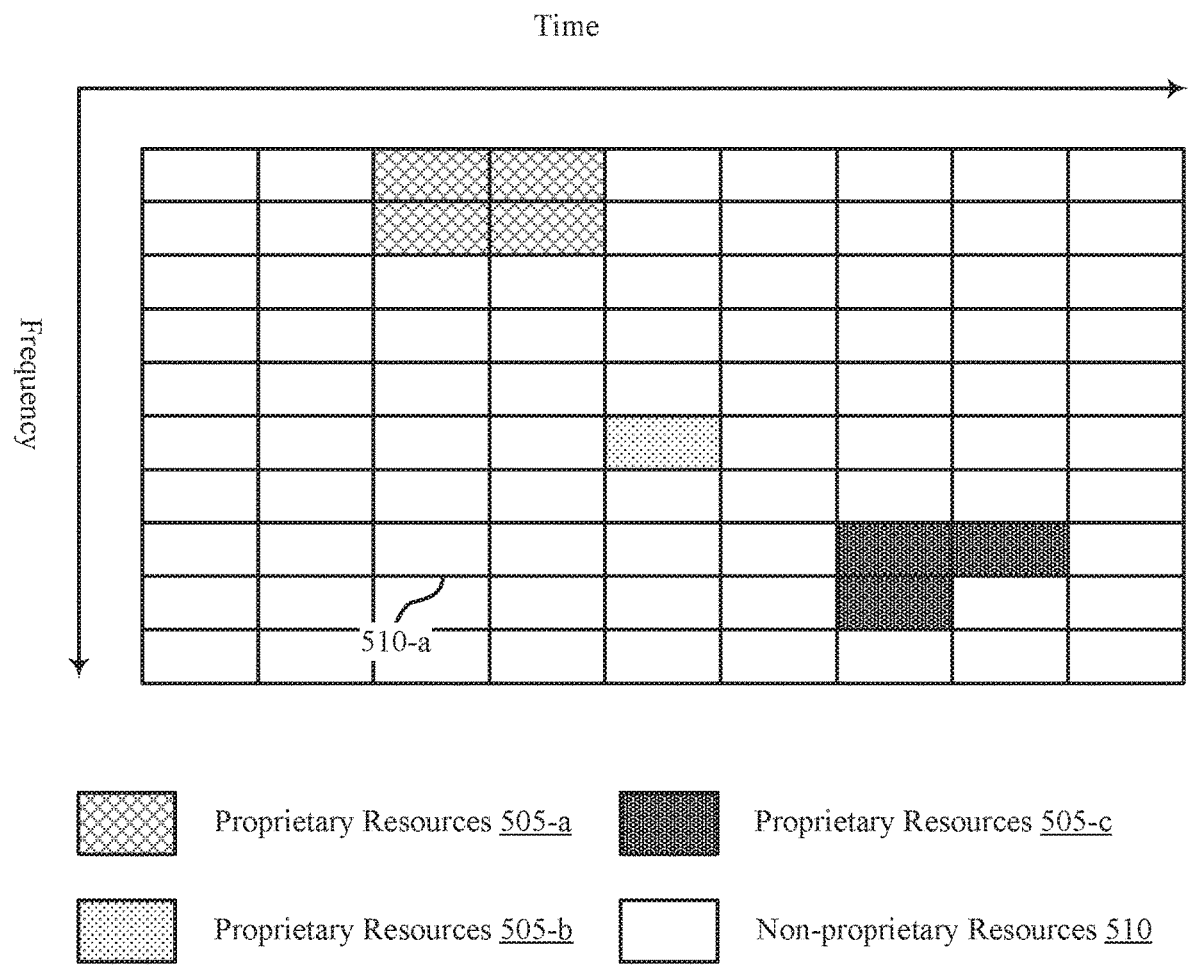
FIG. 5 illustrates an example of an uplink resource schedule that supports proprietary features in wireless communications networks in accordance with aspects of the present disclosure.

FIG. 5 illustrates an example of an uplink resource schedule 500 that supports proprietary features in wireless communications networks in accordance with aspects of the present disclosure. In some examples, uplink resource schedule 500 may implement or be implemented by aspects of wireless communications systems 100 or 200. In some cases, uplink resource schedule 500 may be used by a UE 115 and a base station 105, which may be examples of a UE 115 and a base station 105 described with reference to FIGS. 1-4. As described with reference to FIGS. 1 and 2, the UE 115 and the base station 105 may establish a link over a standard network, may concurrently or subsequently exchange information regarding proprietary services (e.g., including assigning a proprietary RNTI to the UE 115), and may begin proprietary communications.

In some cases, the base station 105 may configure an uplink resource schedule such as uplink resource schedule 500 for communications with one or more UEs 115. In some examples, uplink resource schedule 500 may include proprietary resources 505 and non-proprietary resources 510. Additionally, uplink resource schedule 500 may include proprietary resources reserved for different communications services. For example, proprietary resources 505-a, 505-b, and 505-c may each be reserved for a different communications service that includes proprietary features. In some cases, the base station 105 may assign a proprietary RNTI to the UE 115 related to one or more of the communications services to which proprietary resources 505-a, 505-b, and 505-c are allocated.

As described herein with reference to FIGS. 2 and 4A, the UE 115 may determine to transmit a proprietary uplink scheduling request on any of the proprietary resources 505 which are unoccupied and for which the UE 115 has been assigned a proprietary RNTI. For example, the UE 115 may have a proprietary RNTI assigned for communications services corresponding to proprietary resources 505-c. As such, the UE 115 may determine to communicate using proprietary features associated with the proprietary RNTI and may transmit a proprietary uplink scheduling request over unoccupied resources of proprietary resources 505-c.

In some cases, the base station 105 may receive the proprietary uplink scheduling request over the proprietary resources 505-c and may determine that the scheduling request pertains to the communications service that corresponds to proprietary resources 505-c. Therefore, the base station 105 tray respond to the scheduling request using the proprietary RNTI and begin proprietary communications with the UE 115. This process may be repeated using any proprietary resources 505 corresponding to a proprietary RNTI assigned to the UE 115.

Additionally or alternatively, the UE 115 may transmit a standard uplink scheduling request to the base station 105 using one or more non-proprietary resources 510 (e.g., using non-proprietary resource 510-a). In some examples, the base station 105 may determine that any scheduling request sent over non-proprietary resources 510 (e.g., non-proprietary resource 510-a) is directed to scheduling a standard (e.g., non-proprietary) uplink resource grant for the UE 115. Therefore, the base station 105 may respond to the scheduling request and begin communications with the UE 115 accordingly.

Figure 6:
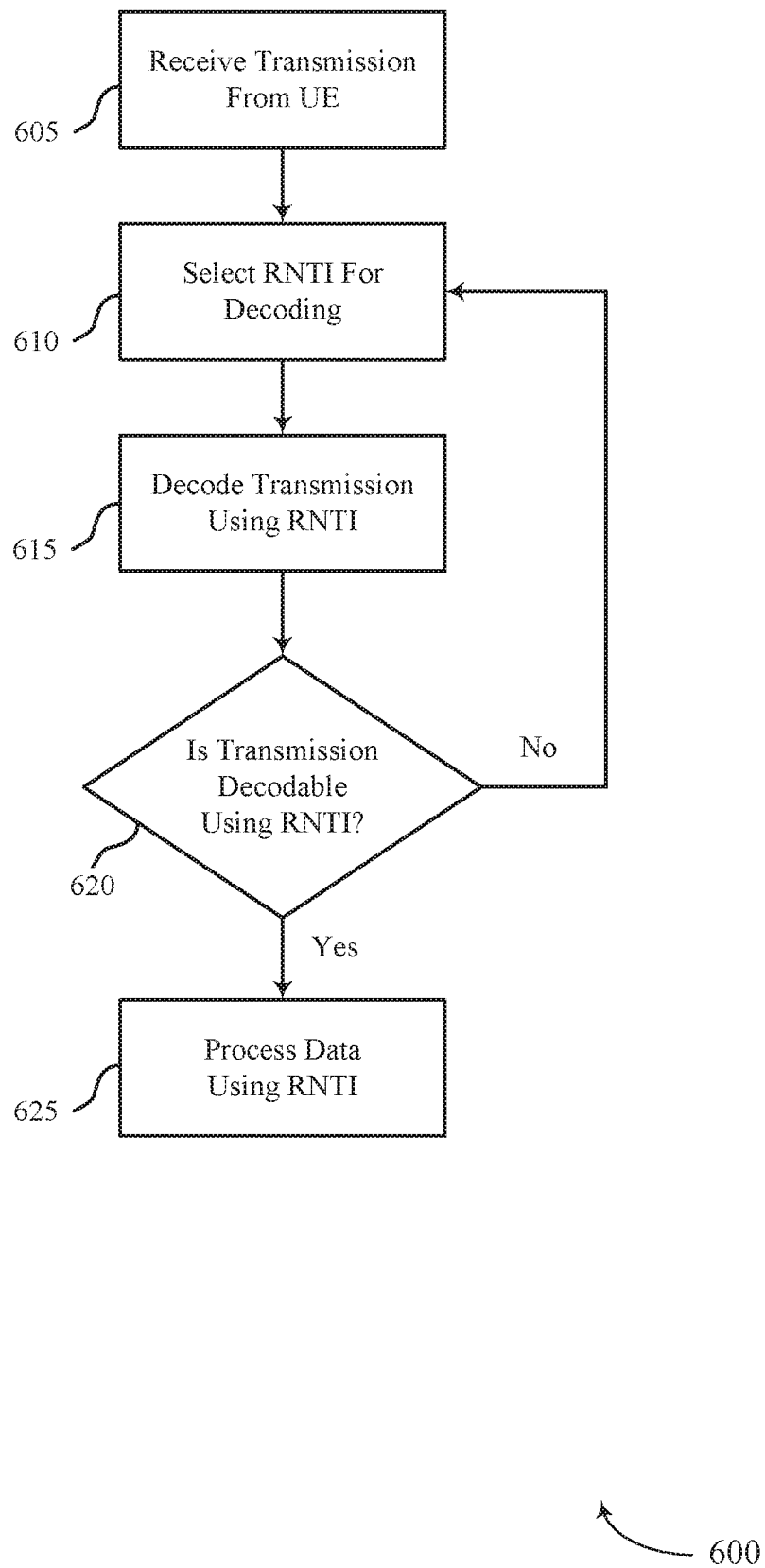
FIG. 6 illustrates an example of a process that supports proprietary features in wireless communications networks in accordance with aspects of the present disclosure.

FIG. 6 illustrates an example of a process 600 that supports proprietary features in wireless communications networks in accordance with aspects of the present disclosure. In some examples, process 600 may implement or be implemented by aspects of wireless communications systems 100 or 200. In some cases, process 600 may be used for proprietary communications between a UE 115 and a base station 105, which may be examples of a UE 115 and a base station 105 described with reference to FIGS. 1-5. As described with reference to FIGS. 1 and 2, the UE 115 and the base station 105 may establish a link over a standard network, may concurrently or subsequently exchange information regarding proprietary services (e.g., including assigning a proprietary RNTI to the UE 115), and may begin proprietary communications.

In some examples, as described with reference to FIG. 4B, the UE 115 may transmit a proprietary uplink scheduling request to the base station 105 using non-proprietary resources. In some cases, the base station may receive the scheduling request and assign an uplink grant to the UE 115 (e.g., using standard DCI). After receiving the uplink grant, the UE 115 may transmit one or more proprietary messages to the base station 105 using resources indicated in the grant. In some cases, the UE 115 may also transmit one or more non-proprietary messages using resources indicated in the grant.

At 605, the base station 105 may receive a transmission from the UE that corresponds to the uplink grant, where the transmission may be a proprietary or a non-proprietary transmission, as described above.

At 610, the base station 105 may select an RNTI from a set of one or more RNTIs (e.g., a C-RNTI and one or more proprietary RNTIs) assigned to the UE 115. In some cases, the base station may select an RNTI randomly or, in some cases, may select an RNTI following a specific (e.g., predefined) sequence or order.

At 615, the base station 105 may attempt to decode the transmission using the selected RNTI.

At 620, the base station 105 may determine whether the transmission is decodable using the selected RNTI. For example, the base station may check a CRC value associated with the transmission in order to determine if the transmission is decoded correctly.

If the transmission is decodable using the selected RNTI (e.g., a CRC pass is detected), the base station 105 may determine that the transmission was encoded at the UE 115 using the selected RNTI and may proceed to 625. At 625, the base station 105 may process the transmission from the UE 115 (e.g., decode and respond to data) using the selected RNTI. Further, the base station may determine whether a transmission format and/or content is proprietary or standard (e.g., non-proprietary) based on the RNTI that successfully decodes the transmission.

If the transmission is not decodable using the selected RNTI (e.g., a CRC fail is detected), the base station may determine that the transmission was not encoded by the UE 115 using the selected RNTI and may return to 610. Accordingly, the base station 105 may select a new RNTI (e.g., randomly or using a defined sequence), attempt to decode the transmission using the new RNTI, and determine whether the transmission is decodable using the new RNTI. Further, if the base station 105 is unable to decode the transmission with the new RNTI, the base station 105 may return to 610, and if the base station successfully decodes the transmission using the new RNTI, the base station 105 may proceed to 625. In some examples, the base station 105 may repeat this procedure until the base station 105 determines that none of the assigned RNTIs may successfully decode the transmission (e.g., after attempting to decode the transmission with all the assigned RNTIs) or until the base station determines that a selected RNTI may successfully decode the transmission.

Figure 7:
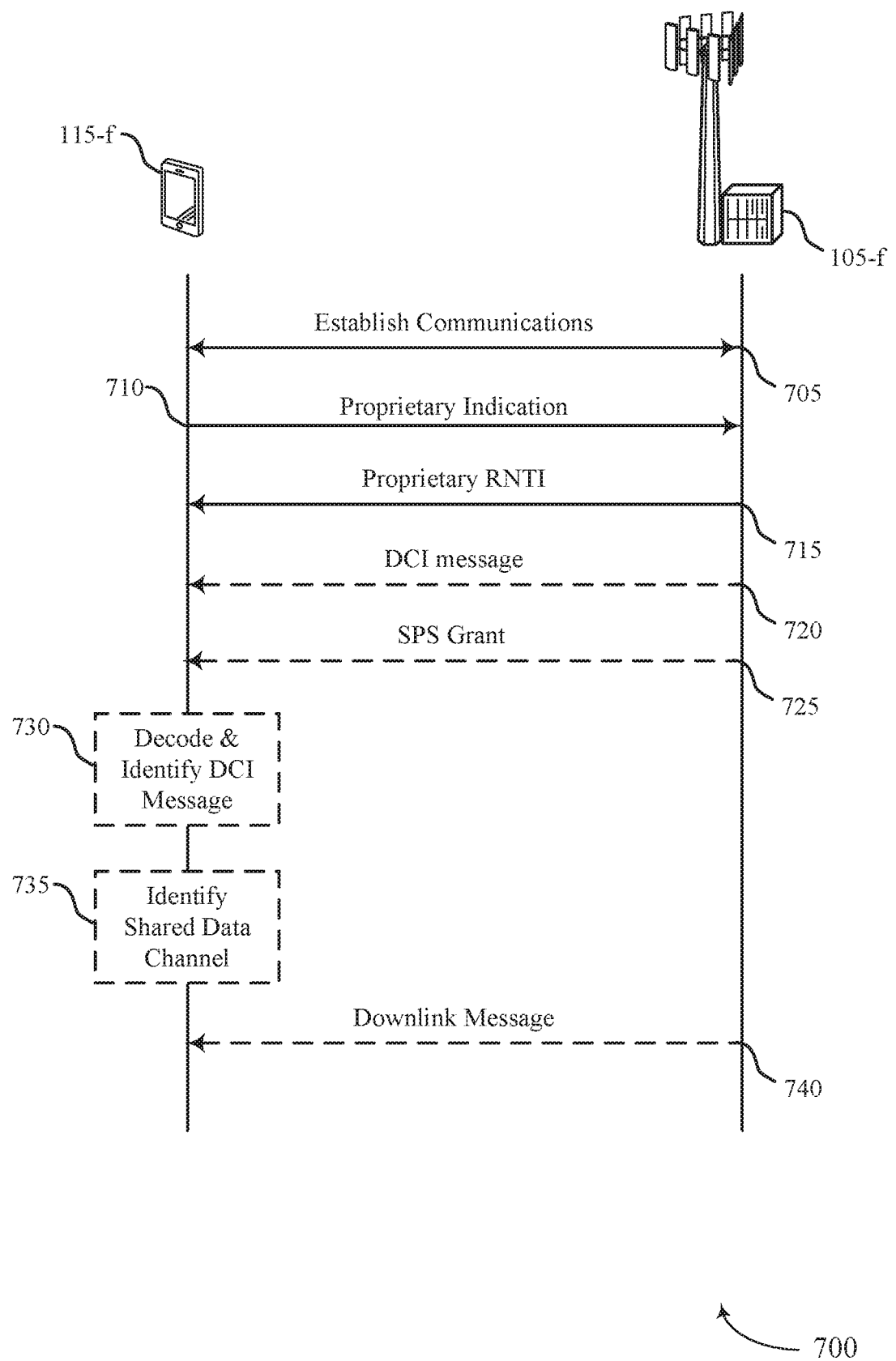
FIGS. 7 and 8 illustrate examples of process flows that supports proprietary features in wireless communications networks in accordance with aspects of the present disclosure.

FIG. 7 illustrates an example of a process flow 700 that supports proprietary features in wireless communications networks in accordance with aspects of the present disclosure. In some examples, process flow 700 may implement or be implemented by aspects of wireless communications systems 100 or 200. Additionally, process flow 700 may implement aspects of proprietary downlink communications 301 and 302. Further, process flow 700 may be implemented by a UE 115-*f* and a base station 105-*f*, which may be examples of a UE 115 and a base station 105 described with reference to FIGS. 1-6.

In the following description of the process flow 700, the operations between UE 115-*f* and base station 105-*f* may be transmitted in a different order than the order shown, or the operations performed by base station 105-*f* and UE 115-*f* may be performed in different orders or at different times. Some operations may also be left out of the process flow 700, or other operations may be added to the process flow 700. It is to be understood that while base station 105-*f* and UE 115-*f* are shown performing a number of the operations of process flow 700, any wireless device may perform the operations shown.

At 705, base station 105-*f* may establish communications (e.g., establish a link) with UE 115-*f* in accordance with a wireless communications standard, where base station 105-*f* and UE 115-*f* may support communications in accordance with the wireless communications standard. In some examples, the wireless communications standard may be a 3GPP standard. In some cases, base station 105-*f* may transmit, to UE 115-*f*, an assignment of a C-RNTI when establishing communications.

At 710, UE 115-*f* may transmit, to base station 105-*f*, signaling that indicates UE 115-*f* also supports a communications service including one or more proprietary features. In some cases, UE 115-*f* may transmit, to base station 105-*f*, an indication of an ID of UE 115-*f*, capability information for UE 115-*f* (e.g., indicating that UE 115-*f* supports the proprietary communications service), or any combination thereof. Accordingly, base station 105-*f* may identify that UE 115-*f* supports the communications service that includes the one or more proprietary features, in addition to supporting communications in accordance with the wireless communications standard. In some cases, base station 105-*f* may determine, based on the ID of UE 115-*f*, that UE 115-*f* supports the communications service.

At 715, base station 105-*f* may transmit, to UE 115-*f*, an assignment of an RNTI for the communications service (e.g., a proprietary RNTI), where the RNTI for the communications service may be distinct from the C-RNTI. In some cases, base station 105-*f* may transmit, to UE 115-*f*, an assignment of one or more additional RNTIs each corresponding to an additional communications service that includes one or more proprietary features. In some examples, the RNTI for the communications service may be specific to UE 115-*f*. After receiving the RNTI for the communications service, UE 115-*f* and base station 105-*f* may communicate in accordance with the communications service based on the RNTI for the communications service.

For example, at 720, base station 105-*f* may transmit, to UE 115-*f*, a DCI message addressed to the RNTI for the communications service. In some cases, at least one of a format or content of the DCI message may be proprietary.

Additionally or alternatively, at 725, base station 105-*f* may transmit, to UE 115-*f*, a grant of an SPS resource for the communications service.

At 730, UE 115-*f* may attempt to decode the DCI message based on the C-RNTI and the proprietary RNTI for UE 115-*f*. In some cases, UE 115-*f* may decode the DCI based on the RNTI for the communications service and may identify the DCI message as associated with the communications service based on successfully decoding the DCI message based on the RNTI for the communications service.

At 735, UE 115-*f* may identify a shared data channel resource based on the DCI message.

At 740, base station 105-*f* may encode a downlink message based on the RNTI for the communications service and transmit the downlink message to UE 115-*f* via the shared data channel resource granted by the DCI message. Additionally or alternatively, base station 105-*f* may encode one or more downlink messages based on the RNTI for the communications service and transmit the one or more downlink messages to UE 115-*f* via the SPS resource. Accordingly, UE 115-*f* may decode the downlink message, and/or the one or more downlink messages, based on the RNTI for the communications service.

In some examples, the downlink message may include a downlink data transmission for the communications service. In some cases, the downlink message may include a MAC CE or an RRC message for the communications service, where at least one of a format or content of the MAC CE or the RRC message may be proprietary. In some examples, the one or more downlink messages may include one or more downlink data transmissions for the proprietary communications service, where at least one of a format or content of the downlink one or more downlink data transmissions may be proprietary. In some cases, the one or more downlink messages may include at least one of a MAC CE or an RRC message for the proprietary communications service, where at least one of a format or content of the MAC CE or the RRC message may be proprietary.

Figure 8:
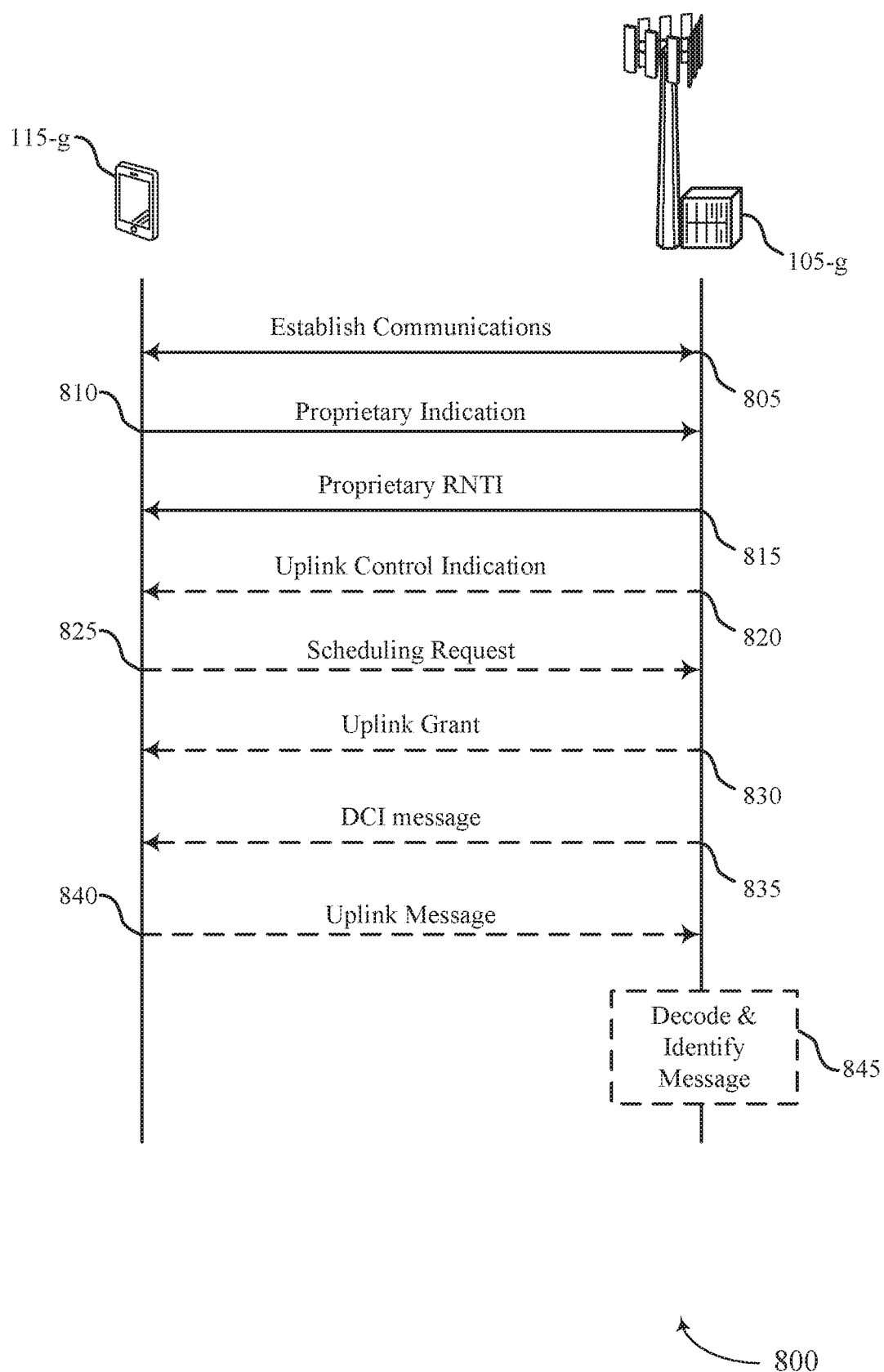

FIG. 8 illustrates an example of a process flow 800 that supports proprietary features in wireless communications networks in accordance with aspects of the present disclosure. In some examples, process flow 800 may implement or be implemented by aspects of wireless communications systems 100 or 200. Additionally, process flow 800 may implement or be implemented by aspects of proprietary uplink communications 401 and 402, uplink resource schedule 500, and process 600. Further, process flow 800 may be implemented by a UE 115-*g* and a base station 105-*g*, which may be examples of a UE 115 and a base station 105 described with reference to FIGS. 1-7.

In the following description of the process flow 800, the operations between UE 115-*g* and base station 105-*g* may be transmitted in a different order than the order shown, or the operations performed by base station 105-*g* and UE 115-*g* may be performed in different orders or at different times. Some operations may also be left out of the process flow 800, or other operations may be added to the process flow 800. It is to be understood that while base station 105-*g* and UE 115-*g* are shown, performing a number of the operations of process flow 800, any wireless device may perform the operations shown.

At 805, base station 105-*g* may establish communications with UE 115-*g* (e.g., establish a link) in accordance with a wireless communications standard, where base station 105-*g* and UE 115-*g* may support communications in accordance with the wireless communications standard. In some examples, the wireless communications standard may be a 3GPP standard. In some cases, base station 105-*g* may transmit, to UE 115-*g*, an assignment of a C-RNTI when establishing communications.

At 810, UE 115-*g* may transmit, to base station 105-*g*, signaling that indicates UE 115-*g* also supports a communications service including one or more proprietary features. In some cases, UE 115-g may transmit, to base station 105-g, an indication of an ID of UE 115-g, capability information for UE 115-g (e.g., indicating that UE 115-g supports the communications service), or any combination thereof. Accordingly, base station 105-g may identify that UE 115-g supports the communications service that includes the one or more proprietary features, in addition to supporting communications in accordance with the wireless communications standard. In some cases, base station 105-g may determine, based on the ID of UE 115-g, that UE 115-g supports the communications service.

At 815, base station 105-g may transmit, to UE 115-g, an assignment of an RNTI for the communications service (e.g., a proprietary RNTI), where the RNTI for the communications service may be distinct from the C-RNTI. In some cases, base station 105-g may transmit, to UE 115-g, an assignment of one or more additional RNTIs each corresponding to an additional communications service that includes one or more proprietary features. In some examples, the RNTI for the communications service may be specific to UE 115-g. After receiving the RNTI for the communications service, UE 115-g and base station 105-g may communicate in accordance with the communications service based on the RNTI for the communications service.

For example, at 820, base station 105-g may transmit, to UE 115-g, an indication of an uplink control channel resource that is reserved for the communications service.

At 825, UE 115-g may transmit, to base station 105-g, a scheduling request or other type of UCI message associated with the communications service. In some cases, at least one of a format or content of the scheduling request or other type of UCI message may be proprietary. In some cases, UE 115-g may transmit, to base station 105-g, a scheduling request (e.g., a non-proprietary or standard scheduling request).

At 830, base station 105-g may transmit, to UE 115-g and in response to receiving the scheduling request, an uplink grant addressed to the RNTI for the communications service. In some cases, base station 105-g may transmit, to UE 115-g, a configured grant of uplink resources for the communications service. Additionally or alternatively, base station 105-g may transmit, to UE 115-g, a configured grant of uplink resources (e.g., a non-proprietary or standard grant).

Additionally or alternatively, at 835, base station 105-g may transmit (e.g., in response to a standard scheduling request), to UE 115-g, a DCI message addressed to the C-RNTI for UE 115-g, where the DCI message may include an uplink grant.

At 840, UE 115-g may encode an uplink message based on the RNTI for the communications service and may transmit the uplink message to base station 105-g via uplink resources granted by the uplink grant. In some cases, UE 115-g may encode one or more uplink messages based on the RNTI for the communications service and transmit the one or more uplink messages to the base station via the uplink resources associated with the configured grant. Accordingly, base station 105-g may decode the uplink message, and/or the one or more uplink messages, based on the RNTI for the communications service.

In some examples, the uplink message may include an uplink data transmission for the communications service. In some cases, the uplink message may include a MAC CE or an RRC message, where at least one of a format or content of the MAC CE or the RRC message may be proprietary. Additionally or alternatively, the one or more uplink messages may include one or more uplink data transmissions for the proprietary communications service, or may include at least one of a MAC CE or an RRC message, where at least one of a format or content of the one or more uplink data transmissions, the MAC CE, or the RRC message may be proprietary.

In some cases, UE 115-g may transmit, to base station 105-g, a set of uplink messages via the uplink resources associated with a configured grant (e.g., the non-proprietary or standard grant), where at least a first uplink message of the set may be encoded based on the C-RNTI for UE 115-g and at least a second uplink message of the set may be encoded based on the RNTI for the communications service.

At 845, base station 105-g may attempt to decode the uplink message based on the C-RNTI and the proprietary RNTI for UE 115-g. In some examples, base station 105-g may identify the uplink message as associated with the communications service based on successfully decoding the uplink message based on the RNTI for the communications service. In some cases, base station 105-g may decode at least a first uplink message of the set of uplink messages based on the C-RNTI for UE 115-g. Similarly, base station 105-g may decode at least a second uplink message of the set of uplink messages based on the RNTI for the communications service. In some examples, base station 105-g may attempt to decode each of the set of uplink messages based on the C-RNTI for the UE and based on the RNTI for the communications service. As such, base station 105-g may identify at least the second uplink message as associated with the communications service based on successfully decoding the second uplink message based on (e.g., using) the RNTI for the communications service.

Figure 9:
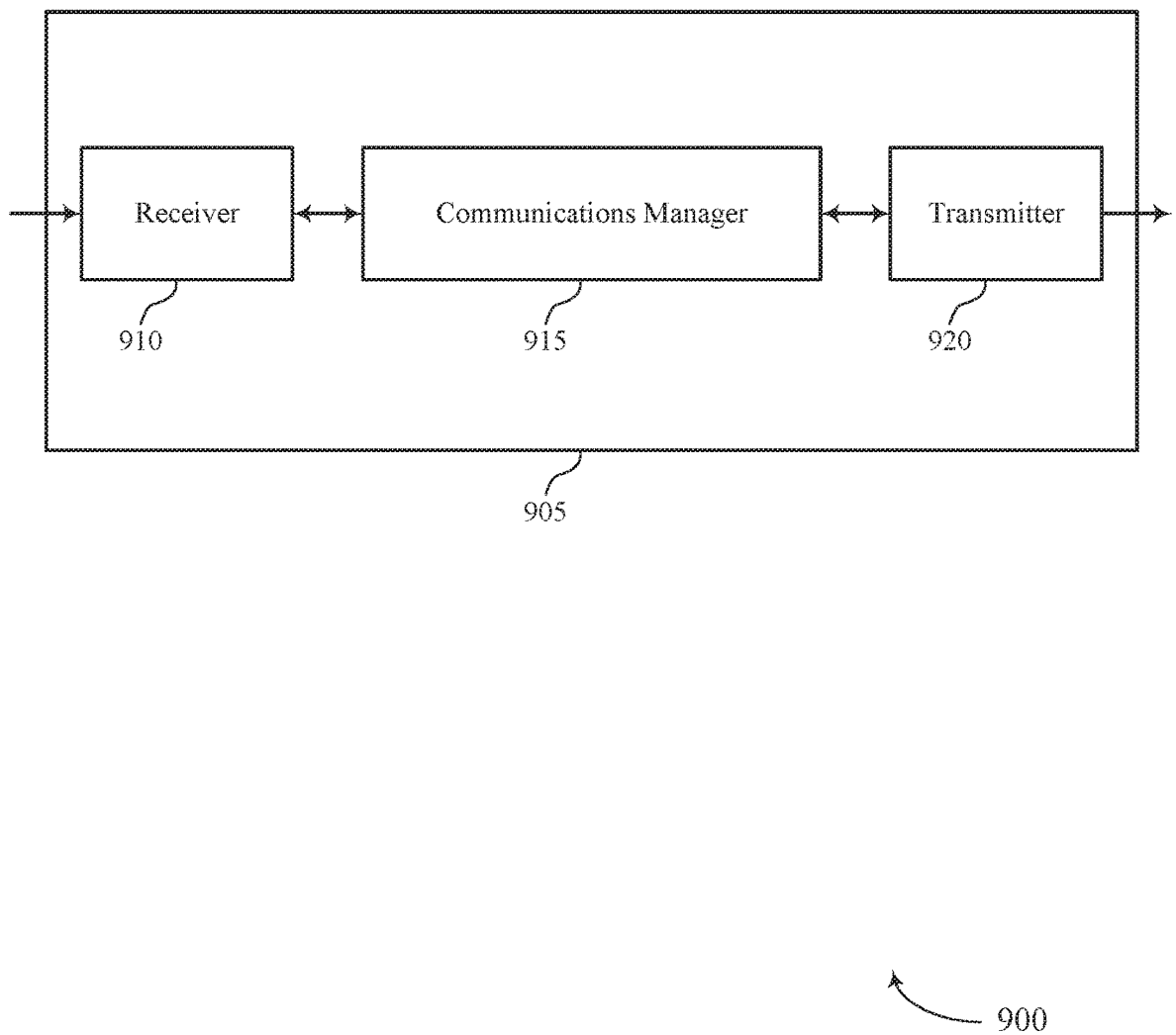
FIGS. 9 and 10 show block diagrams of devices that support proprietary features in wireless communications networks in accordance with aspects of the present disclosure.

FIG. 9 shows a block diagram 900 of a device 905 that supports proprietary features in wireless communications networks in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to support of proprietary features in wireless communications networks, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a base station and in accordance with a wireless communications standard, signaling that indicates the UE supports a communications service including one or more proprietary features, may receive, from the base station, an assignment of a RNTI for the communications service, and may communicate with the base station in accordance with the communications service based on the RNTI for the communications service. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The actions performed by the communications manager 915 as described herein may be implemented to realize one or more potential advantages. For example, communications manager 915 may support one or more proprietary features of a communications service, which may reduce transmission delays, improve transmission accuracy, and reduce retransmissions. Communications manager 915 may further save power and increase battery life at a UE 115 by reducing transmission delays and retransmissions proprietary communications.

Figure 10:
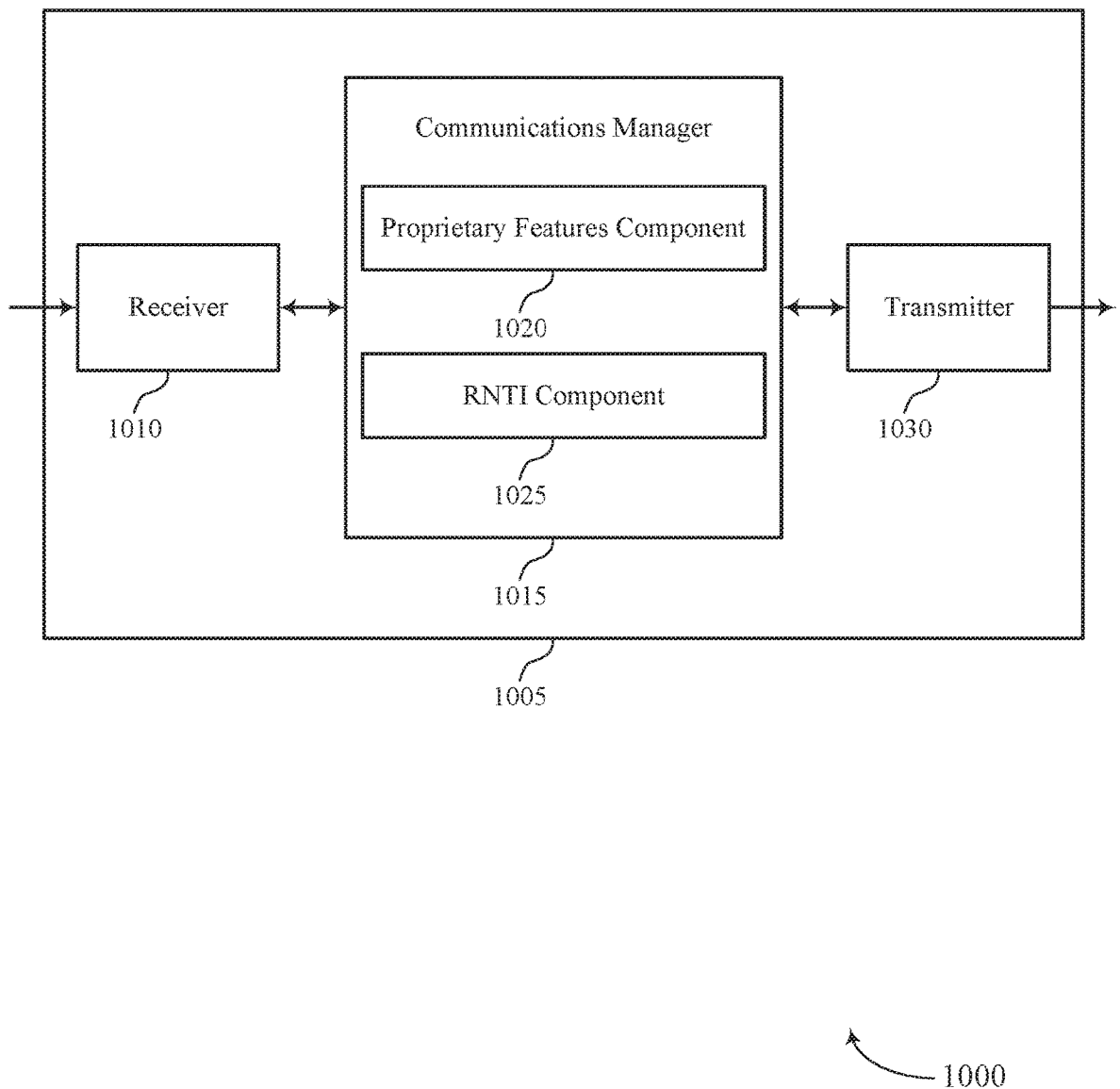

FIG. 10 shows a block diagram 1000 of a device 1005 that supports proprietary features in wireless communications networks in accordance with aspects of the present disclosure. The device 1005 may be an example of aspects of a device 905, or a UE 115 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to support of proprietary features in wireless communications networks, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a proprietary features component 1020 and a RNTI component 1025. The communications manager 1015 may be an example of aspects of the communications manager 1210 described herein.

The proprietary features component 1020 may transmit, to a base station and in accordance with a wireless communications standard, signaling that indicates the UE supports a communications service including one or more proprietary features.

The RNTI component 1025 may receive, from the base station, an assignment of a RNTI for the communications service.

The proprietary features component 1020 may also communicate with the base station in accordance with the communications service based on the RNTI for the communications service.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

A processor of a UE 115 (e.g., controlling the receiver 1010, the transmitter 1030, or the transceiver 1220 as described with reference to FIG. 12) may increase communication reliability and accuracy by supporting one or more proprietary features of a communications service, which may increase reliability and reduce latency (e.g., via implementation of system components described with reference to FIG. 10). Further, the processor of the UE 115 may identify one or more aspects of a communications service configuration to perform the processes described herein (e.g., such as a proprietary RNTI, one or more proprietary resources, or one or more proprietary features). The processor of the UE 115 may identify a proprietary RNTI and one or more proprietary features of a communications service, which may save power and increase battery life at the UE 115 (e.g., by implementing proprietary communications at the UE 115).

Figure 11:
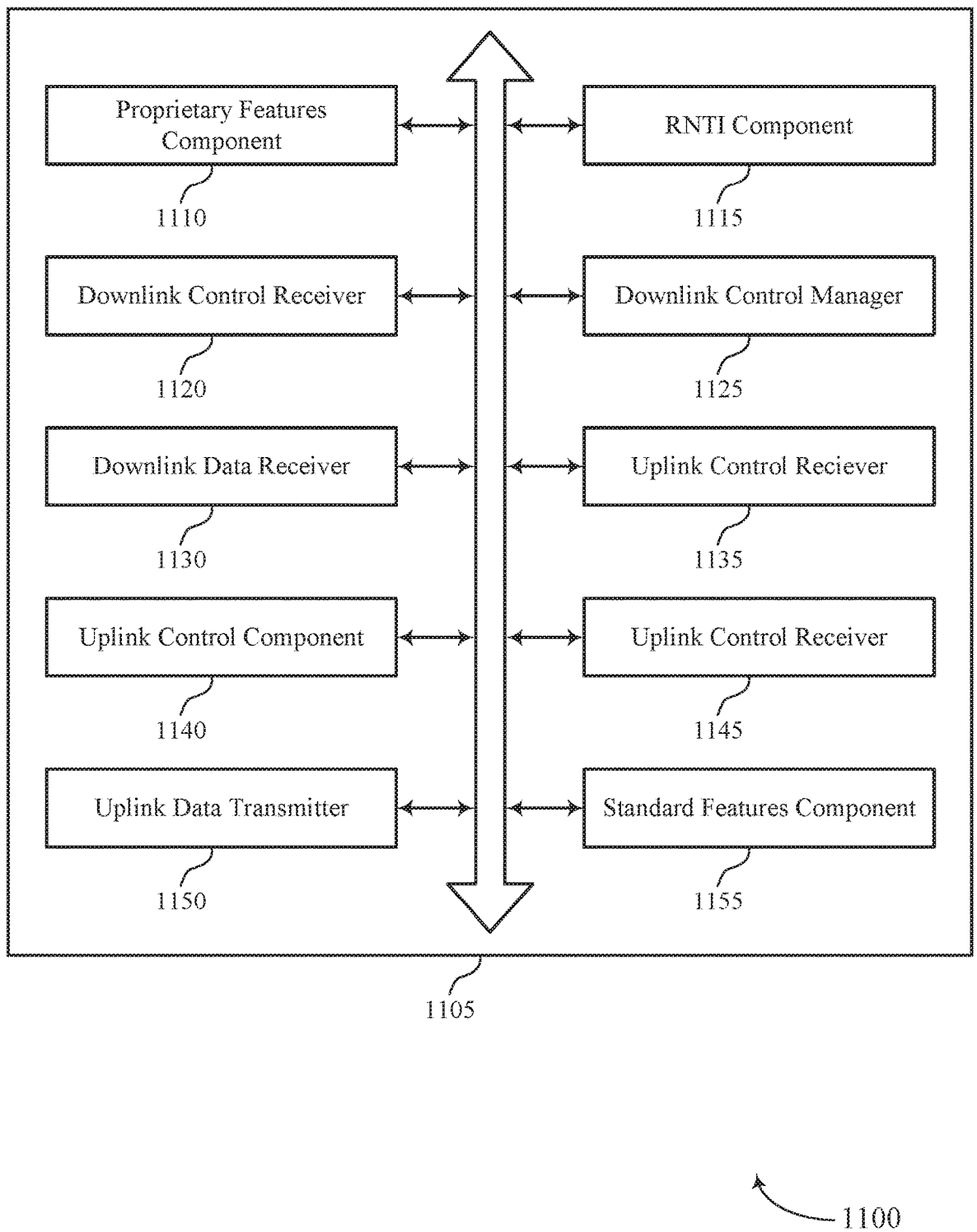
FIG. 11 shows a block diagram of a communications manager that supports proprietary features in wireless communications networks in accordance with aspects of the present disclosure.

FIG. 11 shows a block diagram 1100 of a communications manager 1105 that supports proprietary features in wireless communications networks in accordance with aspects of the present disclosure. The communications manager 1105 may be an example of aspects of a communications manager 915, a communications manager 1015, or a communications manager 1210 described herein. The communications manager 1105 may include a proprietary features component 1110, a RNTI component 1115, a downlink control receiver 1120, a downlink control manager 1125, a downlink data receiver 1130, an uplink control receiver 1135, an uplink control component 1140, an uplink control receiver 1145, an uplink data transmitter 1150, and a standard features component 1155. Each of these modules may communicate, directly or indirectly, with one another (e.g., via one or more buses).

The proprietary features component 1110 may transmit, to a base station and in accordance with a wireless communications standard, signaling that indicates the UE supports a communications service including one or more proprietary features. In some examples, the proprietary features component 1110 may communicate with the base station in accordance with the communications service based on a RNTI for the communications service. In some examples, the proprietary features component 1110 may transmit, to the base station, an indication of an ID of the UE, capability information for the UE, or any combination thereof.

The RNTI component 1115 may receive, from the base station, an assignment of the RNTI for the communications service. In some examples, the RNTI component 1115 may receive, from the base station, an assignment of a C-RNTI, where the RNTI for the communications service is distinct from the C-RNTI. In some examples, the RNTI component 1115 may receive, from the base station, an assignment of one or more additional RNTIs each corresponding to an additional communications service. In some cases, the RNTI for the communications service is specific (e.g., dedicated) to the UE. In some cases, the RNTI for the communications service is specific (e.g., dedicated) to the one or more proprietary features of the communications service.

In some examples, the RNTI component 1115 may attempt to decode a DCI message based on a C-RNTI for the UE. In some examples, the RNTI component 1115 may decode a DCI message based on the RNTI for the communications service. In some examples, the RNTI component 1115 may decode a downlink message based on the RNTI for the communications service. In some examples, the RNTI component 1115 may decode one or more downlink messages based on the RNTI for the communications service. In some examples, the RNTI component 1115 may encode an uplink message based on the RNTI for the communications service. In some examples, the RNTI component 1115 may encode one or more uplink messages based on the RNTI for the communications service.

The downlink control receiver 1120 may receive, from the base station, a DCI message addressed to the RNTI for the communications service. In some examples, the downlink control receiver 1120 may receive, from the base station, a grant of an SPS resource for the communications service. In some examples, the downlink control receiver 1120 may receive, from the base station, a DCI message addressed to a C-RNTI for the UE, where the DCI message includes an uplink grant. In some cases, at least one of a format or content of the DCI message is proprietary.

The downlink control manager 1125 may identify the DCI message as associated with the communications service based on successfully decoding the DCI message based on the RNTI for the communications service. In some examples, the downlink control manager 1125 may identify a shared data channel resource based on the DCI message.

The downlink data receiver 1130 may receive, from the base station, a downlink message via the shared data channel resource. In some examples, the downlink data receiver 1130 may receive, from the base station, one or more downlink messages via the SPS resource. In some cases, the downlink message includes a downlink data transmission for the communications service. In some cases, the downlink message includes a MAC CE or an RRC message for the communications service, and where at least one of a format or content of the MAC CE or the RRC message is proprietary. In some cases, the one or more downlink messages include one or more downlink data transmissions for the communications service. In some cases, the one or more downlink messages include at least one of a MAC CE or an RRC message, and where at least one of a format or content of the MAC CE or the RRC message is proprietary.

The uplink control receiver 1135 may receive, from the base station, an indication of an uplink control channel resource that is reserved for the communications service.

The uplink control component 1140 may transmit, to the base station via the uplink control channel resource, a scheduling request or other type of UCI message associated with the communications service. In some examples, the uplink control component 1140 may transmit, to the base station, a scheduling request. In some cases, at least one of a format or content of the scheduling request or other type of UCI message is proprietary.

The uplink control receiver 1145 may receive, from the base station in response to transmitting the scheduling request, an uplink grant addressed to the RNTI for the communications service. In some examples, the uplink control receiver 1145 may receive, from the base station, a configured grant of uplink resources for the communications service. In some examples, the uplink control receiver 1145 may receive, from the base station, a configured grant of uplink resources.

The uplink data transmitter 1150 may transmit the uplink message to the base station via uplink resources granted by the uplink grant. In some examples, the uplink data transmitter 1150 may transmit the one or more uplink messages to the base station via the uplink resources associated with the configured grant. In some examples, the uplink data transmitter 1150 may transmit, to the base station, a set of uplink messages via the uplink resources associated with the configured grant, where at least a first uplink message of the set is encoded based on a C-RNTI for the UE and at least a second uplink message of the set is encoded based on the RNTI for the communications service.

In some cases, the uplink message includes an uplink data transmission for the communications service. In some cases, the uplink message includes a MAC CE or an RRC message, and where at least one of a format or content of the MAC CE or the RRC message is proprietary. In some cases, the one or more uplink messages include one or more uplink data transmissions for the communications service. In some cases, the one or more uplink messages include at least one of a MAC CE or an RRC message, and where at least one of a format or content of the MAC CE or the RRC message is proprietary.

The standard features component 1155 may transmit messages according to a wireless communications standard, where the wireless communications standard is, in some cases, a 3GPP standard.

Figure 12:
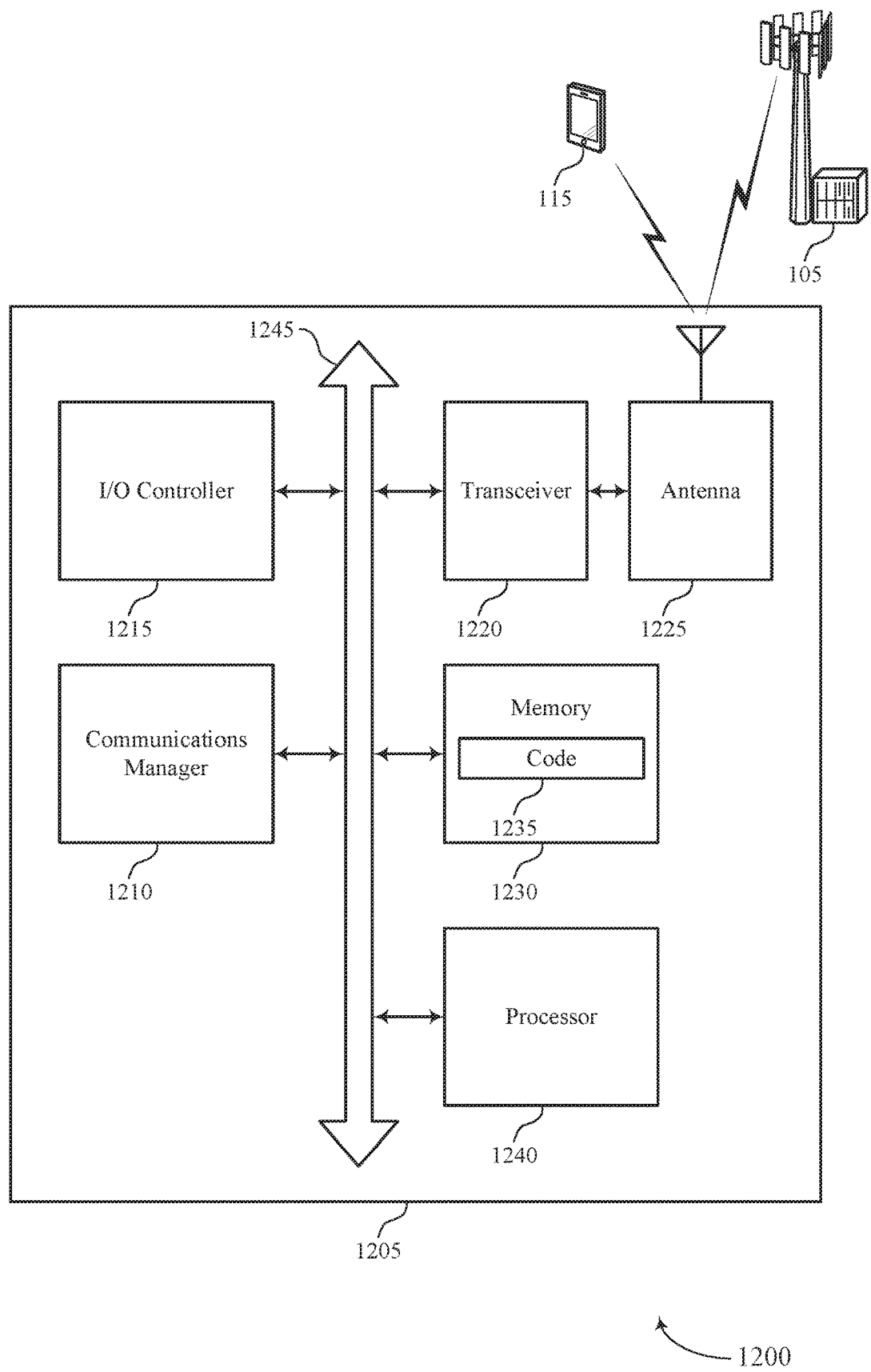
FIG. 12 shows a diagram of a system including a device that supports proprietary features in wireless communications networks in accordance with aspects of the present disclosure.

FIG. 12 shows a diagram of a system 1200 including a device 1205 that supports proprietary features in wireless communications networks in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit, to a base station and in accordance with the wireless communications standard, signaling that indicates the UE supports a communications service including one or more proprietary features, may receive, from the base station, an assignment of a RNTI for the communications service, and may communicate with the base station in accordance with the communications service based on the RNTI for the communications service.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random access memory (RAM) and read only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting support of proprietary features in wireless communications networks).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
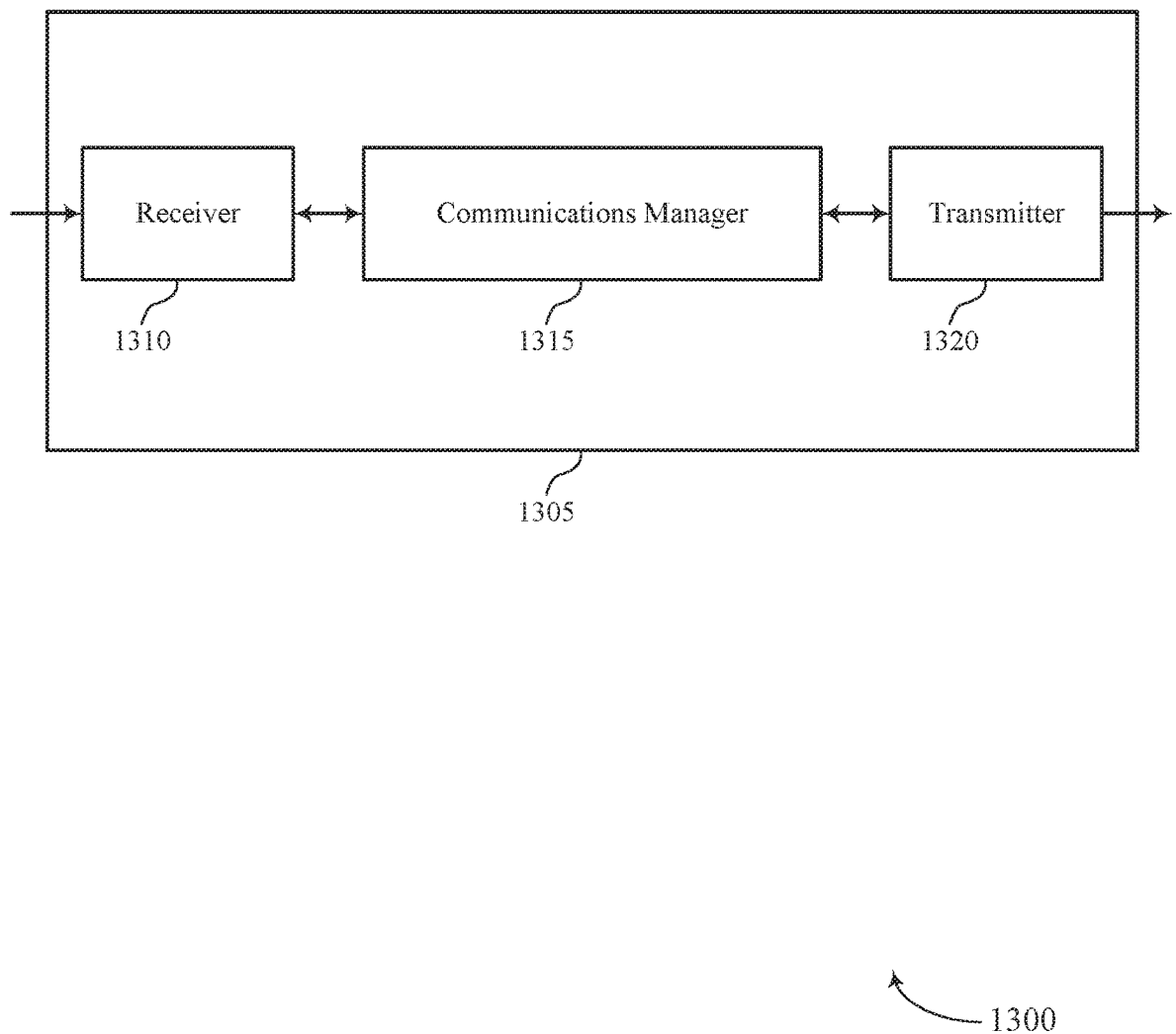
FIGS. 13 and 14 show block diagrams of devices that support proprietary features in wireless communications networks in accordance with aspects of the present disclosure.

FIG. 13 shows a block diagram 1300 of a device 1305 that supports proprietary features in wireless communications networks in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to support of proprietary features in wireless communications networks, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may establish communications with a UE in accordance with a wireless communications standard, identify that the UE supports a communications service including one or more proprietary features, transmit, to the UE, an assignment of a RNTI for the communications service, and communicate with the UE in accordance with the communications service based on the RNTI for the communications service. The communications manager 1315 may be an example of aspects of the communications manager 1610 described herein.

The communications manager 1315, or its sub-components, may be implemented in hardware, code (e.g., software or firmware executed by a processor, or any combination thereof. If implemented in code executed by a processor, the functions of the communications manager 1315, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
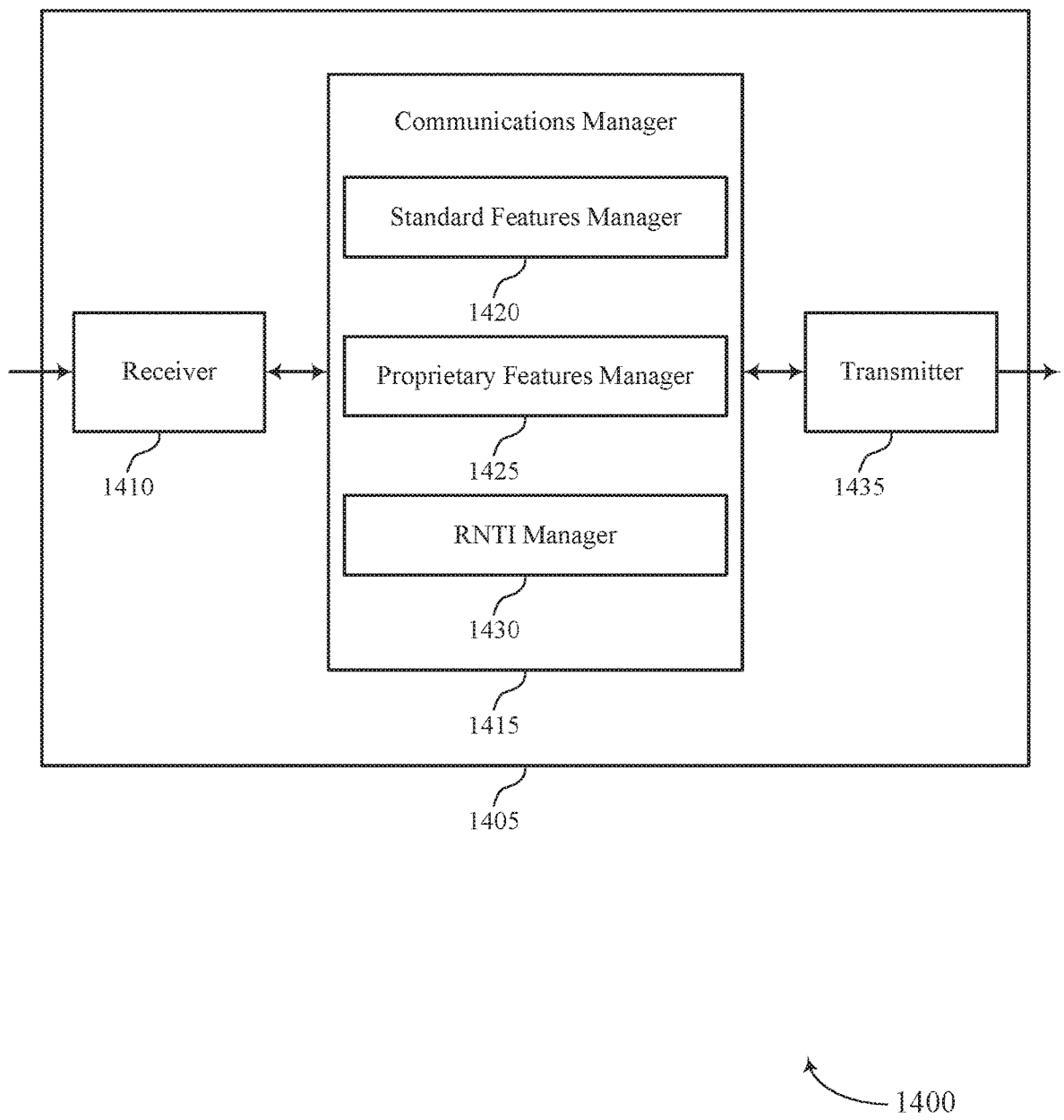

FIG. 14 shows a block diagram 1400 of a device 1405 that supports proprietary features in wireless communications networks in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to support of proprietary features in wireless communications networks, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a standard features manager 1420, a proprietary features manager 1425, and a RNTI manager 1430. The communications manager 1415 may be an example of aspects of the communications manager 1610 described herein.

The standard features manager 1420 may establish communications with a UE in accordance with a wireless communications standard.

The proprietary features manager 1425 may identify that the UE supports a communications service including one or more proprietary features.

The RNTI manager 1430 may transmit, to the UE, an assignment of a RNTI for the communications service.

The proprietary features manager 1425 may also communicate with the UE in accordance with the communications service based on the RNTI for the communications service The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
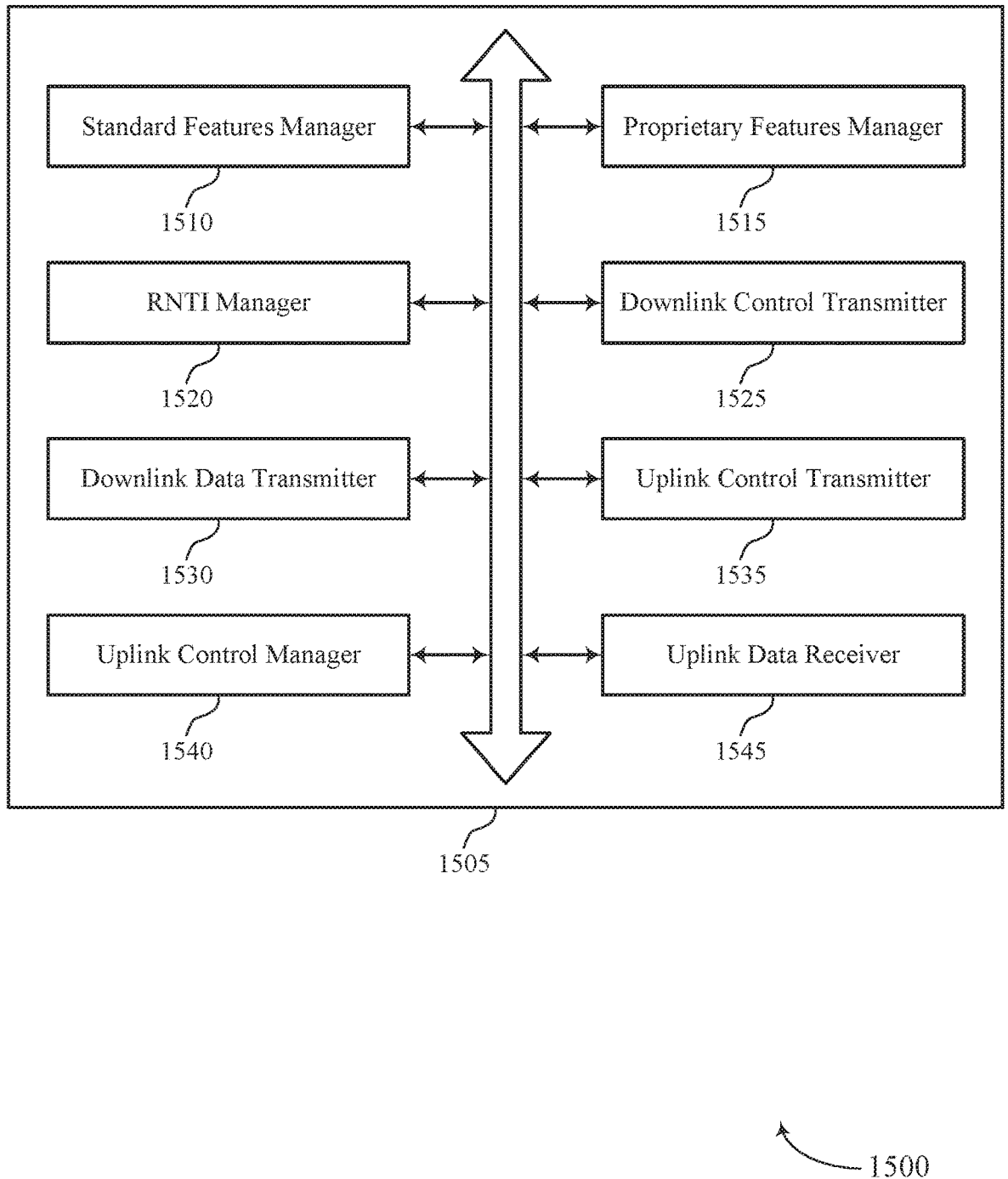
FIG. 15 shows a block diagram of a communications manager that supports proprietary features in wireless communications networks in accordance with aspects of the present disclosure.

FIG. 15 shows a block diagram 1500 of a communications manager 1505 that supports proprietary features in wireless communications networks in accordance with aspects of the present disclosure. The communications manager 1505 may be an example of aspects of a communications manager 1315, a communications manager 1415, or a communications manager 1610 described herein. The communications manager 1505 may include a standard features manager 1510, a proprietary features manager 1515, a RNTI manager 1520, a downlink control transmitter 1525, a downlink data transmitter 1530, an uplink control transmitter 1535, an uplink control manager 1540, and an uplink data receiver 1545. Each of these modules may communicate, directly or indirectly, with one another (e.g., via one or more buses).

The standard features manager 1510 may establish communications with a UE in accordance with a wireless communications standard.

The proprietary features manager 1515 may identify that the UE supports a communications service including one or more proprietary features. In some examples, the proprietary features manager 1515 may communicate with the UE in accordance with the communications service based on a RNTI for the communications service. In some examples, the proprietary features manager 1515 may identify an uplink message as associated with the communications service based on successfully decoding the uplink message based on the RNTI for the communications service. In some examples, the proprietary features manager 1515 may identify at least a second uplink message as associated with the communications service based on successfully decoding the second uplink message based on the RNTI for the communications service. In some examples, the proprietary features manager 1515 may receive, from the UE, an indication of an ID of the UE.

In some examples, the proprietary features manager 1515 may determine, based on the ID of the UE, that the UE supports the communications service. In some examples, the proprietary features manager 1515 may receive, from the UE, capability information indicating that the UE also supports the communications service.

The RNTI manager 1520 may transmit, to the UE, an assignment of the RNTI for the communications service. In some examples, the RNTI manager 1520 may encode a downlink message based on the RNTI for the communications service. In some examples, the RNTI manager 1520 may encode one or more downlink messages based on the RNTI for the communications service. In some examples, the RNTI manager 1520 may decode an uplink message based on the RNTI for the communications service. In some examples, the RNTI manager 1520 may decode one or more uplink messages based on the RNTI for the communications service. In some examples, the RNTI manager 1520 may attempt to decode the uplink message based on a C-RNTI for the UE.

In some examples, the RNTI manager 1520 may decode at least a first uplink message of a set based on a C-RNTI for the UE. In some examples, the RNTI manager 1520 may decode at least a second uplink message of the set based on the RNTI for the communications service. In some examples, the RNTI manager 1520 may attempt to decode each of the set of uplink messages based on the C-RNTI for the UE and based on the RNTI for the communications service. In some examples, the RNTI manager 1520 may transmit, to the UE, an assignment of a C-RNTI, where the RNTI for the communications service is distinct from the C-RNTI. In some examples, the RNTI manager 1520 may transmit, to the UE, an assignment of one or more additional RNTIs each corresponding to an additional communications service. In some cases, the RNTI for the communications service is specific to the UE. In some cases, the RNTI for the communications service is specific to the one or more proprietary features of the communications service.

The downlink control transmitter 1525 may transmit, to the UE, a DCI message addressed to the RNTI for the communications service. In some cases, at least one of a format or content of the DCI message is proprietary. In some examples, the downlink control transmitter 1525 may transmit, to the UE, a grant of an SPS resource for the communications service, in some examples, transmitting, to the UE, a DCI message addressed to a C-RNTI for the UE, where the DCI message includes an uplink grant.

The downlink data transmitter 1530 may transmit the downlink message to the UE via a shared data channel resource granted by the DCI message. In some examples, the downlink data transmitter 1530 may transmit the one or more downlink messages to the UE via the SPS resource. In some cases, the downlink message includes a downlink data transmission for the communications service. In some cases, the downlink message includes a MAC CE or an RRC message based on the RNTI for the communications service, and where at least one of a format or content of the MAC CE or the RRC message is proprietary. In some cases, the one or more downlink messages include one or more downlink data transmissions for the communications service. In some cases, the one or more downlink messages include at least one of a MAC CE or an RRC message, and where at least one of a format or content of the MAC CE or the RRC message is proprietary.

The uplink control transmitter 1535 may transmit, to the UE, an indication of an uplink control channel resource that is reserved for the communications service. In some examples, the uplink control transmitter 1535 may transmit, to the UE in response to receiving the scheduling request, an uplink grant addressed to the RNTI for the communications service. In some examples, the uplink control transmitter 1535 may transmit, to the UE, a configured grant of uplink resources for the communications service. In some examples, the uplink control transmitter 1535 may transmit, to the UE, a configured grant of uplink resources.

The uplink control manager 1540 may receive, from the UE via the uplink control channel resource, a scheduling request or other type of UCI message associated with the communications service. In some cases, at least one of a format or content of the scheduling request or other type of UCI message is proprietary. In some examples, the uplink control manager 1540 may receive, from the UE, a scheduling request.

The uplink data receiver 1545 may receive, from the UE, an uplink message via uplink resources granted by the uplink grant. In some examples, the uplink data receiver 1545 may receive, from the UE, one or more uplink messages via the uplink resources associated with the configured grant. In some examples, the uplink data receiver 1545 may receive an uplink message from the UE via uplink resources granted by the uplink grant. In some examples, the uplink data receiver 1545 may receive, from the UE, a set of uplink messages via the uplink resources associated with the configured grant. In some cases, the uplink message includes an uplink data transmission for the communications service. In some cases, the uplink message includes a MAC CE or an RRC message, and where at least one of a format or content of the MAC CE or the RRC message is proprietary. In some cases, the one or more uplink messages include one or more uplink data transmissions for the communications service. In some cases, the one or more uplink messages include at least one of a MAC CE or an RRC message, and where at least one of a format or content of the MAC CE or the RRC message is proprietary.

Figure 16:
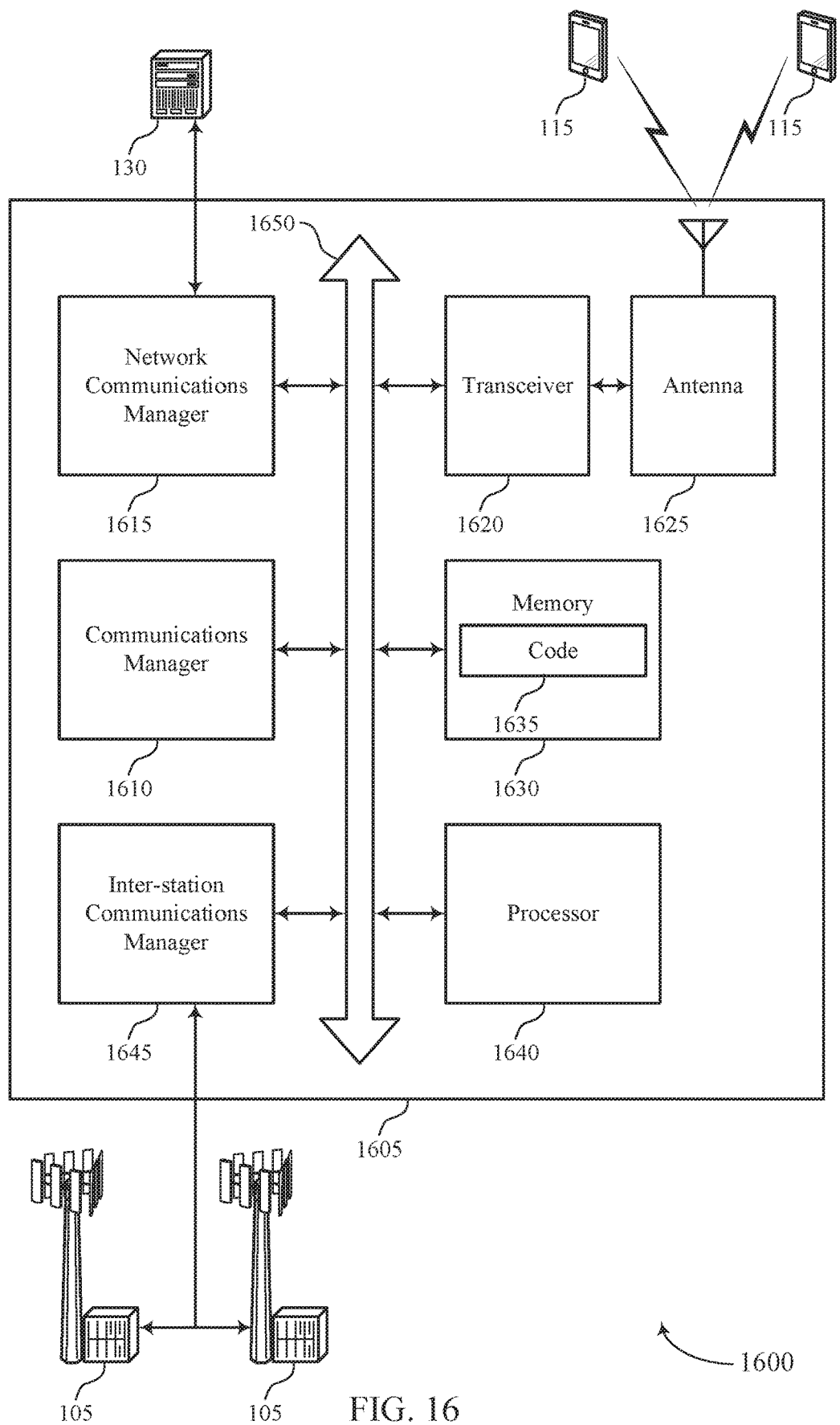
FIG. 16 shows a diagram of a system including a device that supports proprietary features in wireless communications networks in accordance with aspects of the present disclosure.

FIG. 16 shows a diagram of a system 1600 including a device 1605 that supports proprietary features in wireless communications networks in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may establish communications with a UE in accordance with a wireless communications standard, identify that the UE supports a communications service including one or more proprietary features, transmit, to the UE, an assignment of a RNTI for the communications service, and communicate with the UE in accordance with the communications service based on the RNTI for the communications service.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate hi-directionally, via one or more antennas, wired, or wireless links as described above. For example, the transceiver 1620 may represent a wireless transceiver and may communicate hi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting support of communications services in wireless communications networks).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
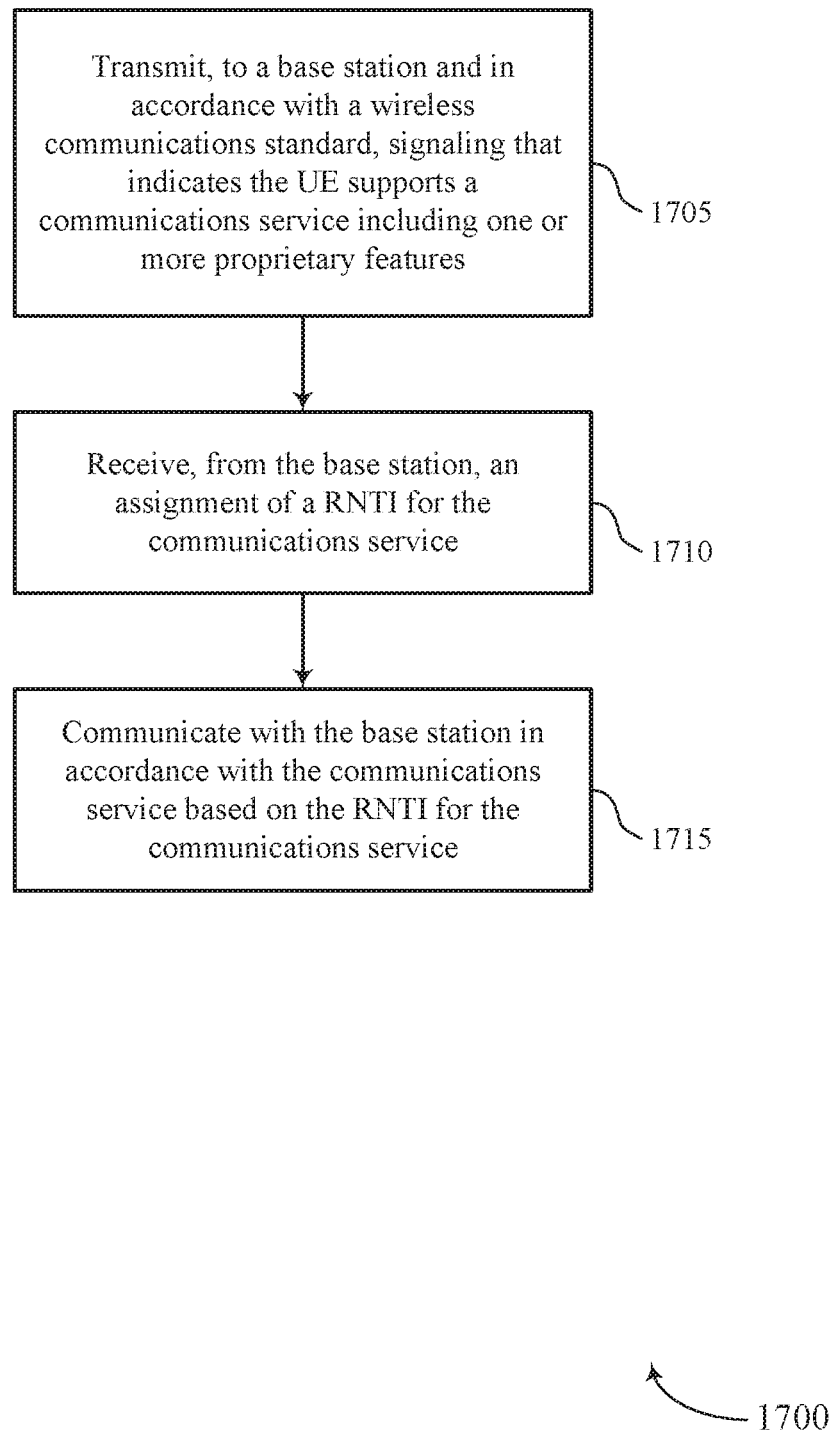
FIGS. 17 through 24 show flowcharts illustrating methods that support proprietary features in wireless communications networks in accordance with aspects of the present disclosure.

FIG. 17 shows a flowchart illustrating a method 1700 that supports proprietary features in wireless communications networks in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station and in accordance with a wireless communications standard, signaling that indicates the UE supports a communications service including one or more proprietary features. The operations of 1705 may be performed according to the methods described herein. In some examples, aspects of the operations of 1705 may be performed by a proprietary features component as described with reference to FIGS. 9 through 12.

At 1710, the UE may receive, from the base station, an assignment of a RNTI for the communications service. The operations of 1710 may be performed according to the methods described herein. In some examples, aspects of the operations of 1710 may be performed by a RNTI component as described with reference to FIGS. 9 through 12.

At 1715, the UE may communicate with the base station in accordance with the communications service based on the RNTI for the communications service. The operations of 1715 may be performed according to the methods described herein. In some examples, aspects of the operations of 1715 may be performed by a proprietary features component as described with reference to FIGS. 9 through 12.

Figure 18:
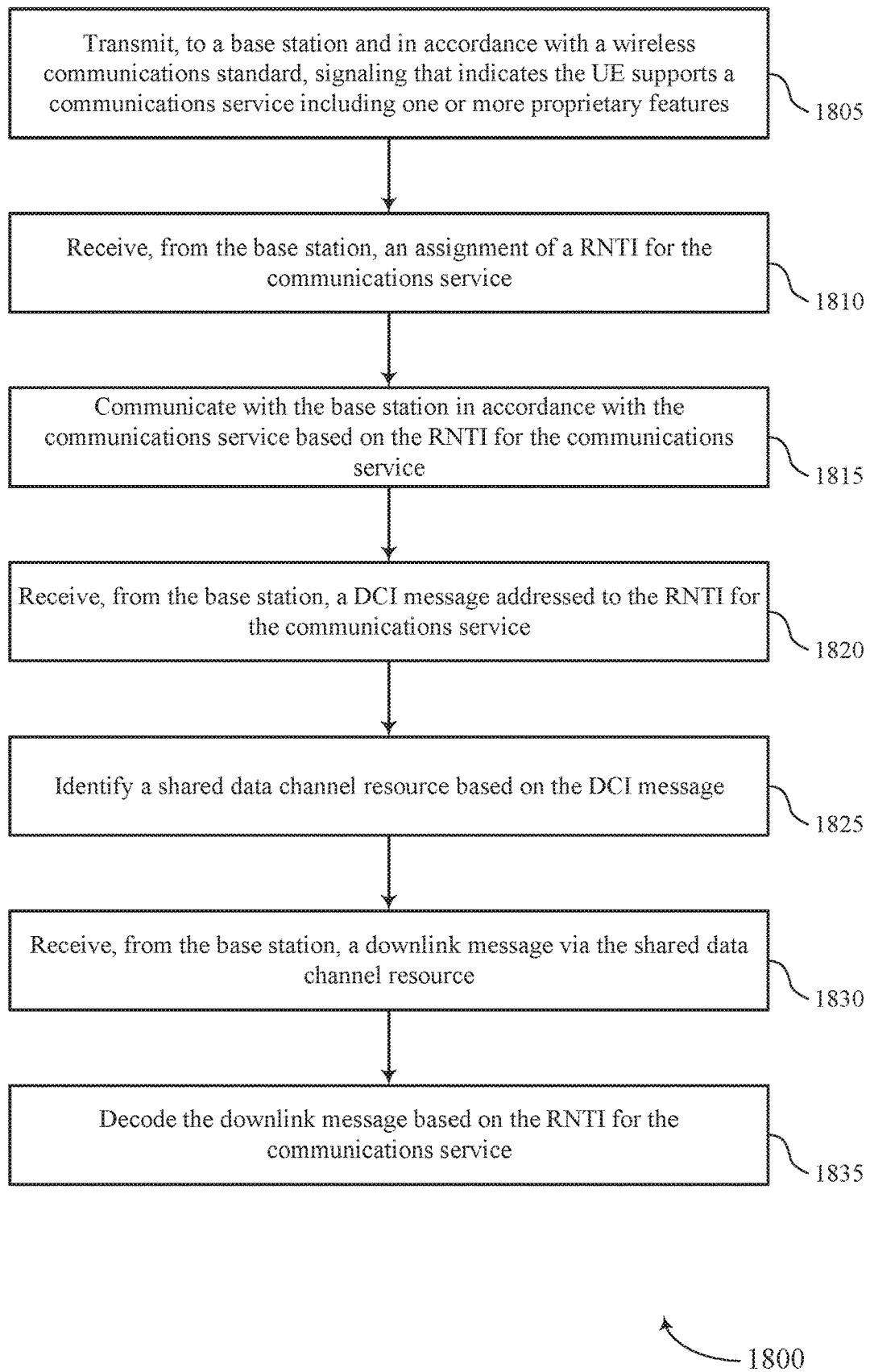

FIG. 18 shows a flowchart illustrating a method 1800 that supports proprietary features in wireless communications networks in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit, to a base station and in accordance with a wireless communications standard, signaling that indicates the UE supports a communications service including one or more proprietary features. The operations of 1805 may be performed according to the methods described herein. In some examples, aspects of the operations of 1805 may be performed by a proprietary features component as described with reference to FIGS. 9 through 12.

At 1810, the UE may receive, from the base station, an assignment of a RNTI the the communications service. The operations of 1810 may be performed according to the methods described herein. In some examples, aspects of the operations of 1810 may be performed by a RNTI component as described with reference to FIGS. 9 through 12.

At 1815, the UE may communicate with the base station in accordance with the communications service based on the RNTI for the communications service. The operations of 1815 may be performed according to the methods described herein. In some examples, aspects of the operations of 1815 may be performed by a proprietary features component as described with reference to FIGS. 9 through 12.

At 1820, the UE may receive, from the base station, a DCI message addressed to the RNTI for the communications service. The operations of 1820 may be performed according to the methods described herein. In some examples, aspects of the operations of 1820 may be performed by a downlink control receiver as described with reference to FIGS. 9 through 12.

At 1825, the UE may identify a shared data channel resource based on the DCI message. The operations of 1825 may be performed according to the methods described herein. In some examples, aspects of the operations of 1825 may be performed by a downlink control manager as described with reference to FIGS. 9 through 12.

At 1830, the UE may receive, from the base station, a downlink message via the shared data channel resource. The operations of 1830 may be performed according to the methods described herein. In some examples, aspects of the operations of 1830 may be performed by a downlink data receiver as described with reference to FIGS. 9 through 12.

At 1835, the UE may decode the downlink message based on the RNTI for the communications service. The operations of 1835 may be performed according to the methods described herein. In some examples, aspects of the operations of 1835 may be performed by a RNTI component as described with reference to FIGS. 9 through 12.

Figure 19:
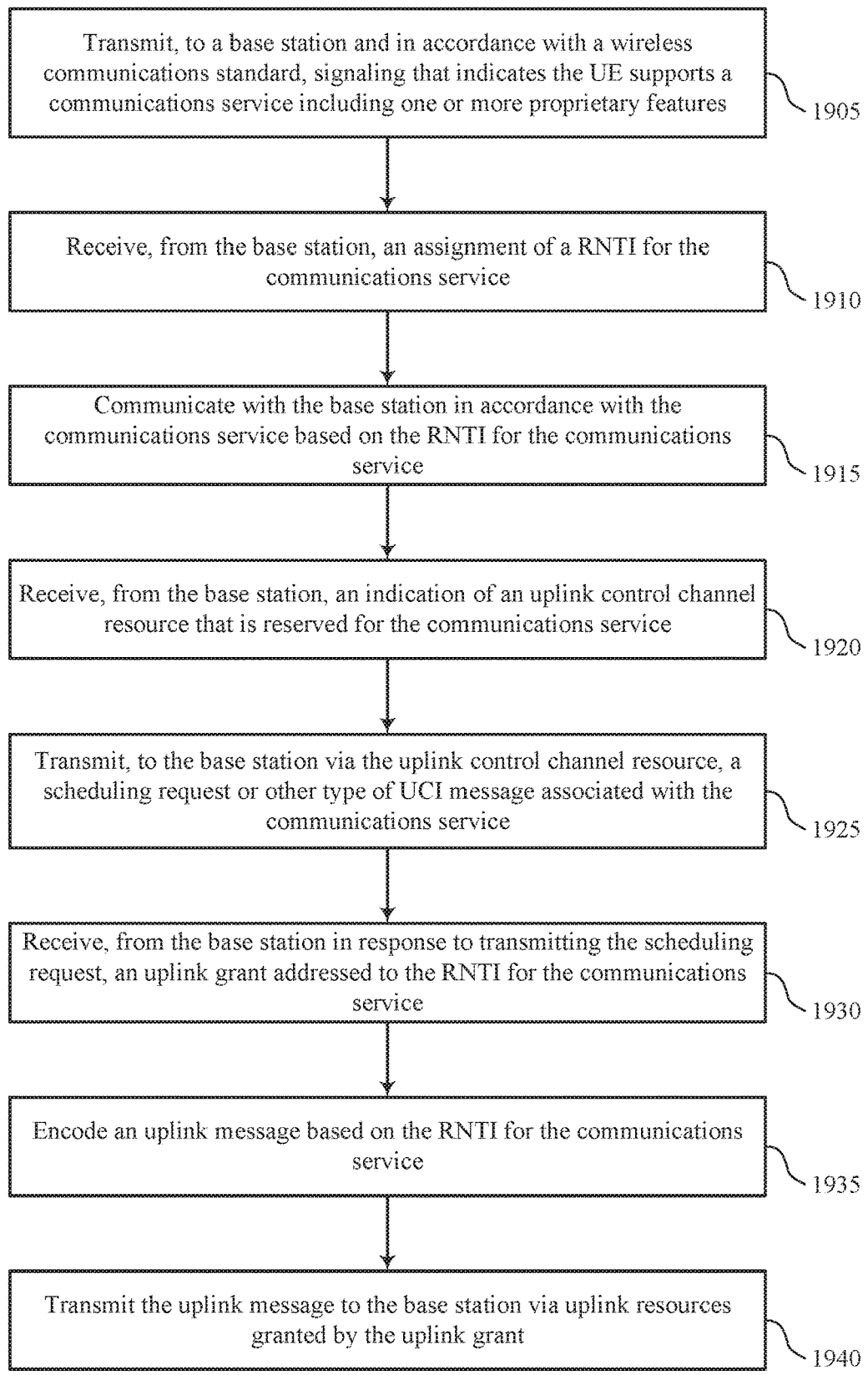

FIG. 19 shows a flowchart illustrating a method 1900 that supports proprietary features in wireless communications networks in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may transmit, to a base station and in accordance with a wireless communications standard, signaling that indicates the UE supports a communications service including one or more proprietary features. The operations of 1905 may be performed according to the methods described herein. In some examples, aspects of the operations of 1905 may be performed by a proprietary features component as described with reference to FIGS. 9 through 12.

At 1910, the UE may receive, from the base station, an assignment of a RNTI for the communications service. The operations of 1910 may be performed according to the methods described herein. In some examples, aspects of the operations of 1910 may be performed by a RNTI component as described with reference to FIGS. 9 through 12.

At 1915, the UE may communicate with the base station in accordance with the communications service based on the RNTI for the communications service. The operations of 1915 may be performed according to the methods described herein. In some examples, aspects of the operations of 1915 may be performed by a proprietary features component as described with reference to FIGS. 9 through 12.

At 1920, the UE may receive, from the base station, an indication of an uplink control channel resource that is reserved for the communications service. The operations of 1920 may be performed according to the methods described herein. In some examples, aspects of the operations of 1920 may be performed by an uplink control receiver as described with reference to FIGS. 9 through 12.

At 1925, the UE may transmit, to the base station via the uplink control channel resource, a scheduling request or other type of UCI message associated with the communications service. The operations of 1925 may be performed according to the methods described herein. In some examples, aspects of the operations of 1925 may be performed by an uplink control component as described with reference to FIGS. 9 through 12.

At 1930, the UE may receive, from the base station in response to transmitting the scheduling request, an uplink grant addressed to the RNTI for the communications service. The operations of 1930 may be performed according to the methods described herein. In some examples, aspects of the operations of 1930 may be performed by an uplink control receiver as described with reference to FIGS. 9 through 12.

At 1935, the UE may encode an uplink message based on the RNTI for the communications service. The operations of 1935 may be performed according to the methods described herein. In some examples, aspects of the operations of 1935 may be performed by a RNTI component as described with reference to FIGS. 9 through 12.

At 1940, the UE may transmit the uplink message to the base station via uplink resources granted by the uplink grant.

The operations of 1940 may be performed according to the methods described herein. In some examples, aspects of the operations of 1940 may be performed by an uplink data transmitter as described with reference to FIGS. 9 through 12.

Figure 20:
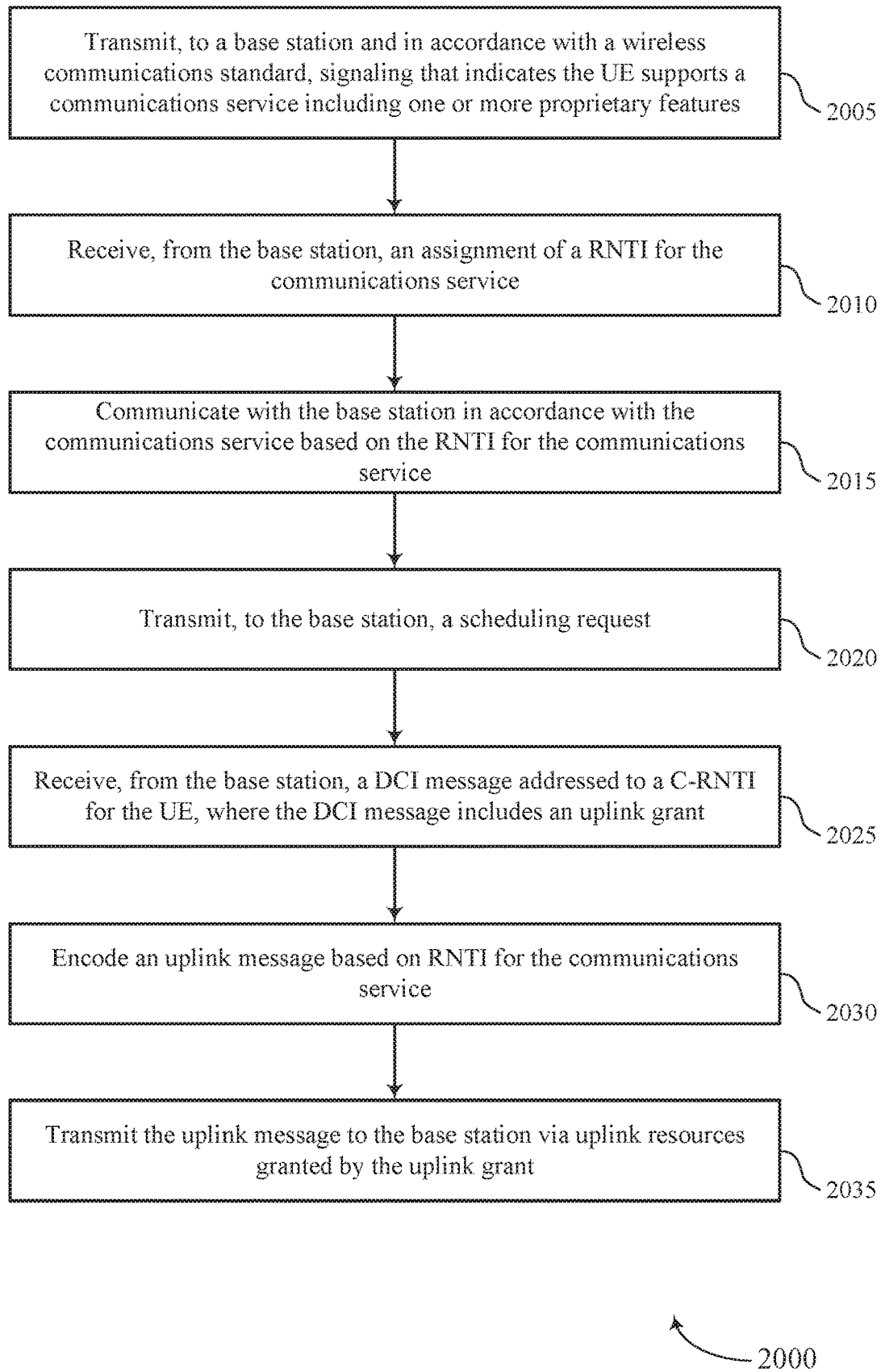

FIG. 20 shows a flowchart illustrating a method 2000 that supports proprietary features in wireless communications networks in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may transmit, to a base station and in accordance with a wireless communications standard, signaling that indicates the UE supports a communications service including one or more proprietary features. The operations of 2005 may be performed according to the methods described herein. In some examples, aspects of the operations of 2005 may be performed by a proprietary features component as described with reference to FIGS. 9 through 12.

At 2010, the UE may receive, from the base station, an assignment of a RNTI for the communications service. The operations of 2010 may be performed according to the methods described herein. In some examples, aspects of the operations of 2010 may be performed by a RNTI component as described with reference to FIGS. 9 through 12.

At 2015, the UE may communicate with the base station in accordance with the communications service based on the RNTI for the communications service. The operations of 2015 may be performed according to the methods described herein. In some examples, aspects of the operations of 2015 may be performed by a proprietary features component as described with reference to FIGS. 9 through 12.

At 2020, the UE may transmit, to the base station, a scheduling request. The operations of 2020 may be performed according to the methods described herein. In some examples, aspects of the operations of 2020 may be performed by an uplink control component as described with reference to FIGS. 9 through 12.

At 2025, the UE may receive, from the base station, a DCI message addressed to a C-RNTI for the UE, where the DCI message includes an uplink grant. The operations of 2025 may be performed according to the methods described herein. In some examples, aspects of the operations of 2025 may be performed by a downlink control receiver as described with reference to FIGS. 9 through 12.

At 2030, the UE may encode an uplink message based on the RNTI for the communications service. The operations of 2030 may be performed according to the methods described herein. In some examples, aspects of the operations of 2030 may be performed by a. RNTI component as described with reference to FIGS. 9 through 12.

At 2035, the UE may transmit the uplink message to the base station via uplink resources granted by the uplink grant. The operations of 2035 may be performed according to the methods described herein. In some examples, aspects of the operations of 2035 may be performed by an uplink data transmitter as described with reference to FIGS. 9 through 12.

Figure 21:
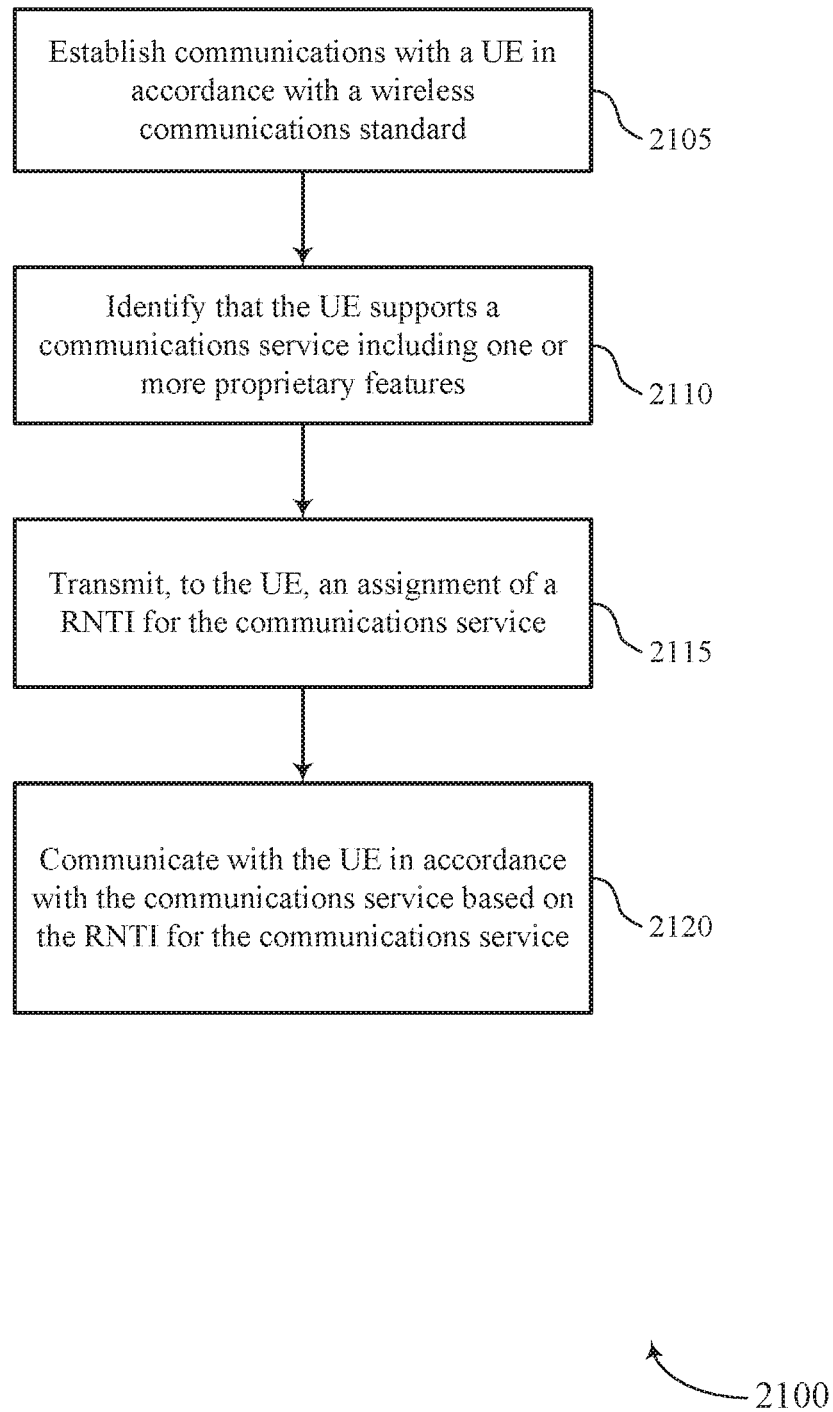

FIG. 21 shows a flowchart illustrating a method 2100 that supports proprietary features in wireless communications networks in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may establish communications with a UE in accordance with a wireless communications standard. The operations of 2105 may be performed according to the methods described herein. In some examples, aspects of the operations of 2105 may be performed by a standard features manager as described with reference to FIGS. 13 through 16.

At 2110, the base station may identify that the UE supports a communications service including one or more proprietary features. The operations of 2110 may be performed according to the methods described herein, in some examples, aspects of the operations of 2110 may be performed by a proprietary features manager as described with reference to FIGS. 13 through 16.

At 2115, the base station may transmit, to the UE, an assignment of a RNTI for the communications service. The operations of 2115 may be performed according to the methods described herein. In some examples, aspects of the operations of 2115 may be performed by a RNTI manager as described with reference to FIGS. 13 through 16.

At 2120, the base station may communicate with the UE in accordance with the communications service based on the RNTI for the communications service. The operations of 2120 may be performed according to the methods described herein. In some examples, aspects of the operations of 2120 may be performed by a proprietary features manager as described with reference to FIGS. 13 through 16.

Figure 22:
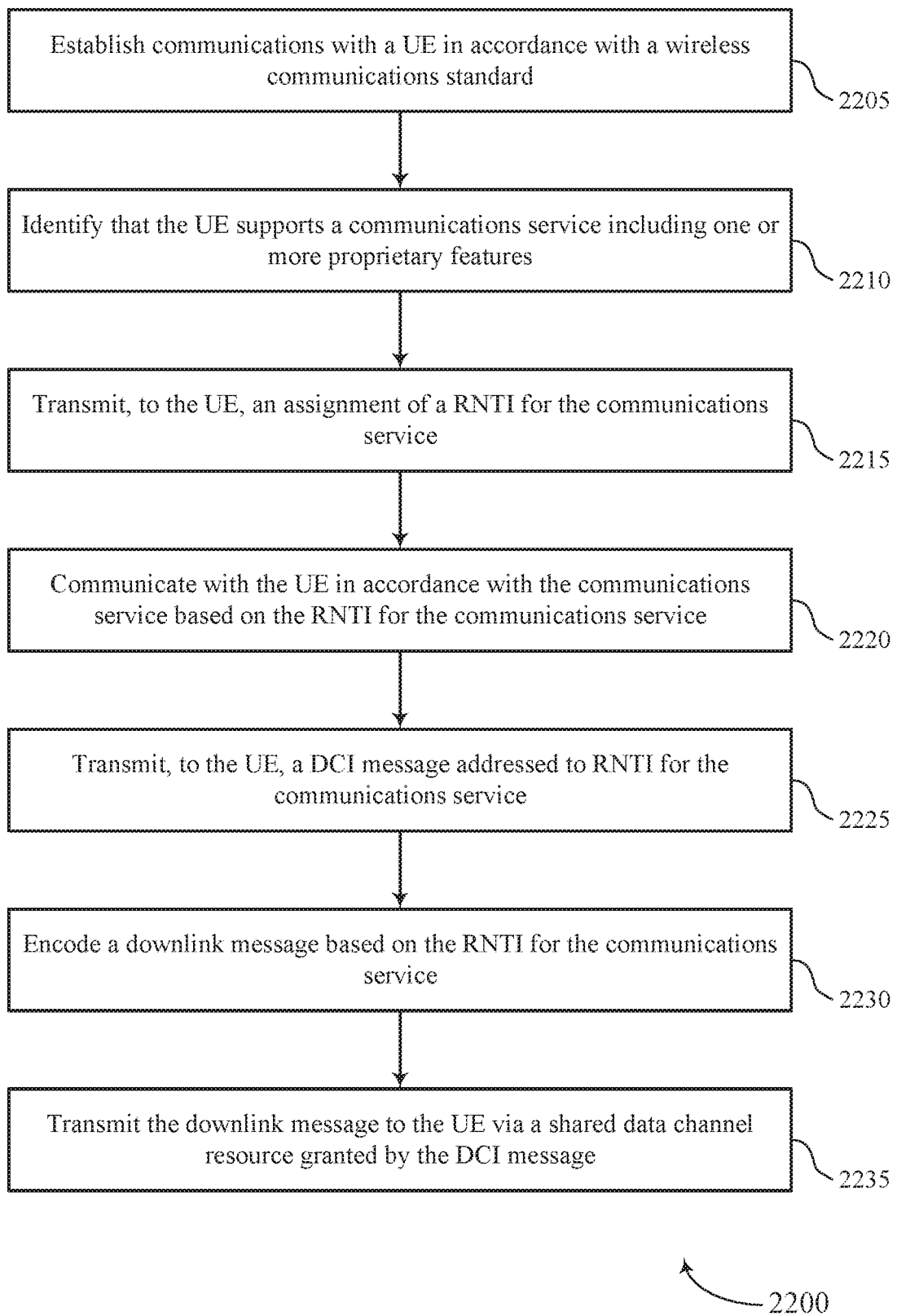

FIG. 22 shows a flowchart illustrating a method 2200 that supports proprietary features in wireless communications networks in accordance with aspects of the present disclosure. The operations of method 2200 may be implemented by a base station 105 or its components as described herein. For example, the operations of method 2200 may be performed by a communications manager as described with reference to FIGS. 13 through 16. In some examples, a base station may execute a set of instructions to control the functional elements of the base station to perform the functions described below. Additionally or alternatively, a base station may perform, aspects of the functions described below using special-purpose hardware.

At 2205, the base station may establish communications with a UE in accordance with a wireless communications standard. The operations of 2205 may be performed according to the methods described herein. In some examples, aspects of the operations of 2205 may be performed by a standard features manager as described with reference to FIGS. 13 through 16.

At 2210, the base station may identify that the UE supports a communications service including one or more proprietary features. The operations of 2210 may be performed according to the methods described herein. In some examples, aspects of the operations of 2210 may be performed by a proprietary features manager as described with reference to FIGS. 13 through 16.

At 2215, the base station may transmit, to the UE, an assignment of a RNTI for the communications service. The operations of 2215 may be performed according to the methods described herein. In some examples, aspects of the operations of 2215 may be performed by a RNTI manager as described with reference to FIGS. 13 through 16.

At 2220, the base station may communicate with the UE in accordance with the communications service based on the RNTI for the communications service. The operations of 2220 may be performed according to the methods described herein. In some examples, aspects of the operations of 2220 may be performed by a proprietary features manager as described with reference to FIGS. 13 through 16.

At 2225, the base station may transmit, to the UE, a DCI message addressed to the RNTI for the communications service. The operations of 2225 may be performed according to the methods described herein. In some examples, aspects of the operations of 2225 may be performed by a downlink control transmitter as described with reference to FIGS. 13 through 16.

At 2230, the base station may encode a downlink message based on the RNTI for the communications service. The operations of 2230 may be performed according to the methods described herein. In some examples, aspects of the operations of 2230 may be performed by a RNTI manager as described with reference to FIGS. 13 through 16.

At 2235, the base station may transmit the downlink message to the UE via a shared data channel resource granted by the DCI message. The operations of 2235 may be performed according to the methods described herein. In some examples, aspects of the operations of 2235 may be performed by a downlink data transmitter as described with reference to FIGS. 13 through 16.

Figure 23:
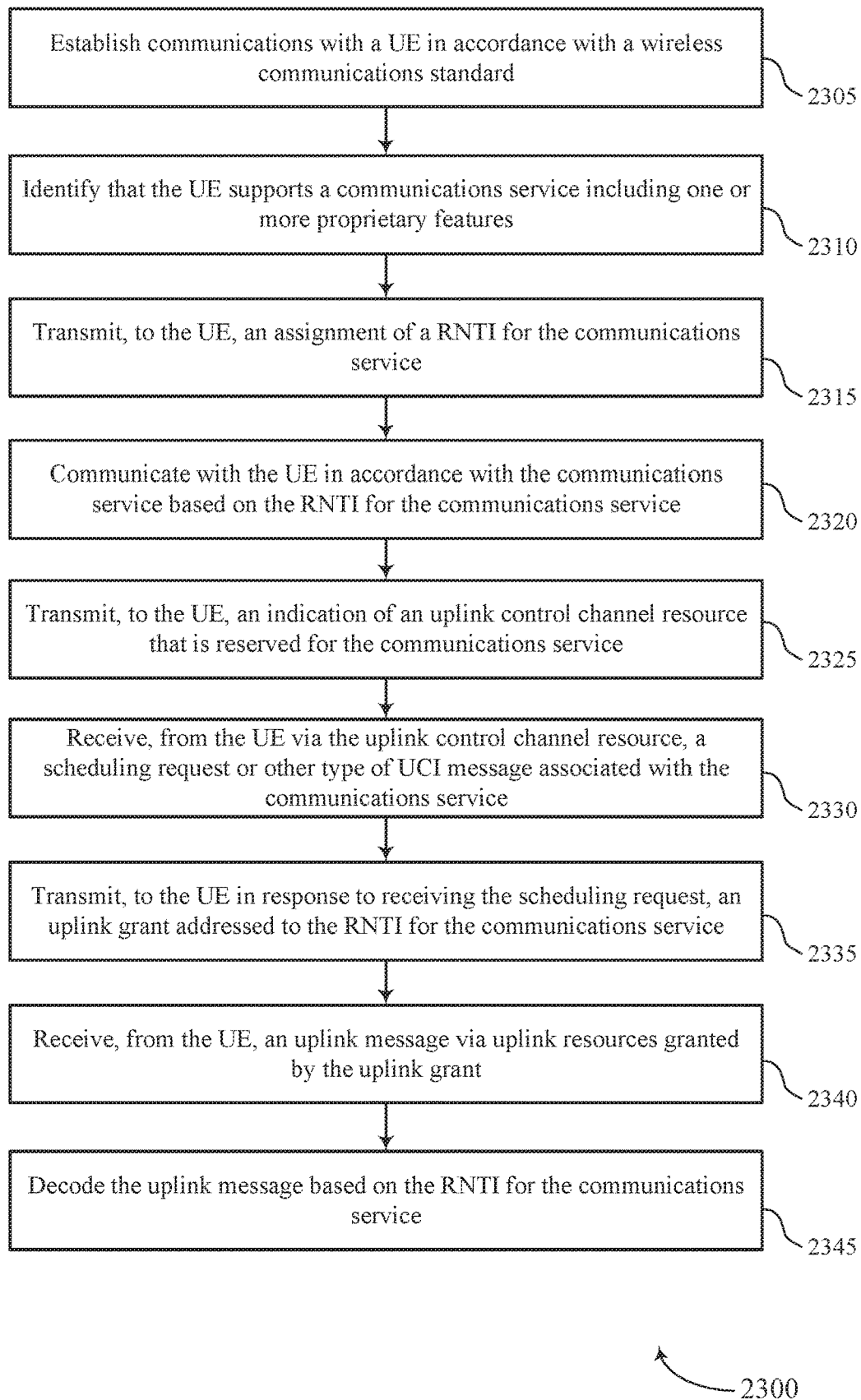

FIG. 23 shows a flowchart illustrating a method 2300 that supports proprietary features in wireless communications networks in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may establish communications with a UE in accordance with a wireless communications standard. The operations of 2305 may be performed according to the methods described herein. In some examples, aspects of the operations of 2305 may be performed by a standard features manager as described with reference to FIGS. 13 through 16.

At 2310, the base station may identify that the UE supports a communications service including one or more proprietary features. The operations of 2310 may be performed according to the methods described herein. In some examples, aspects of the operations of 2310 may be performed by a proprietary features manager as described with reference to FIGS. 13 through 16.

At 2315, the base station may transmit, to the UE, an assignment of a RNTI for the communications service. The operations of 2315 may be performed according to the methods described herein. In some examples, aspects of the operations of 2315 may be performed by a RNTI manager as described with reference to FIGS. 13 through 16.

At 2320, the base station may communicate with the UE in accordance with the communications service based on the RNTI for the communications service. The operations of 2320 may be performed according to the methods described herein. In some examples, aspects of the operations of 2320 may be performed by a proprietary features manager as described with reference to FIGS. 13 through 16.

At 2325, the base station may transmit, to the UE, an indication of an uplink control channel resource that is reserved for the communications service. The operations of 2325 may be performed according to the methods described herein. In some examples, aspects of the operations of 2325 may be performed by an uplink control transmitter as described with reference to FIGS. 13 through 16.

At 2330, the base station may receive, from the UE via the uplink control channel resource, a scheduling request or other type of UCI message associated with the communications service. The operations of 2330 may be performed according to the methods described herein. In some examples, aspects of the operations of 2330 may be performed by an uplink control manager as described with reference to FIGS. 13 through 16.

At 2335, the base station may transmit, to the UE in response to receiving the scheduling request, an uplink grant addressed to the RNTI for the communications service. The operations of 2335 may be performed according to the methods described herein. In some examples, aspects of the operations of 2335 may be performed by an uplink control transmitter as described with reference to FIGS. 13 through 16.

At 2340, the base station may receive, from the UE, an uplink message via uplink resources granted by the uplink grant. The operations of 2340 may be performed according to the methods described herein. In some examples, aspects of the operations of 2340 may be performed by an uplink data receiver as described with reference to FIGS. 13 through 16.

At 2345, the base station may decode the uplink message based on the RNTI for the communications service. The operations of 2345 may be performed according to the methods described herein. In some examples, aspects of the operations of 2345 may be performed by a RNTI manager as described with reference to FIGS. 13 through 16.

Figure 24:
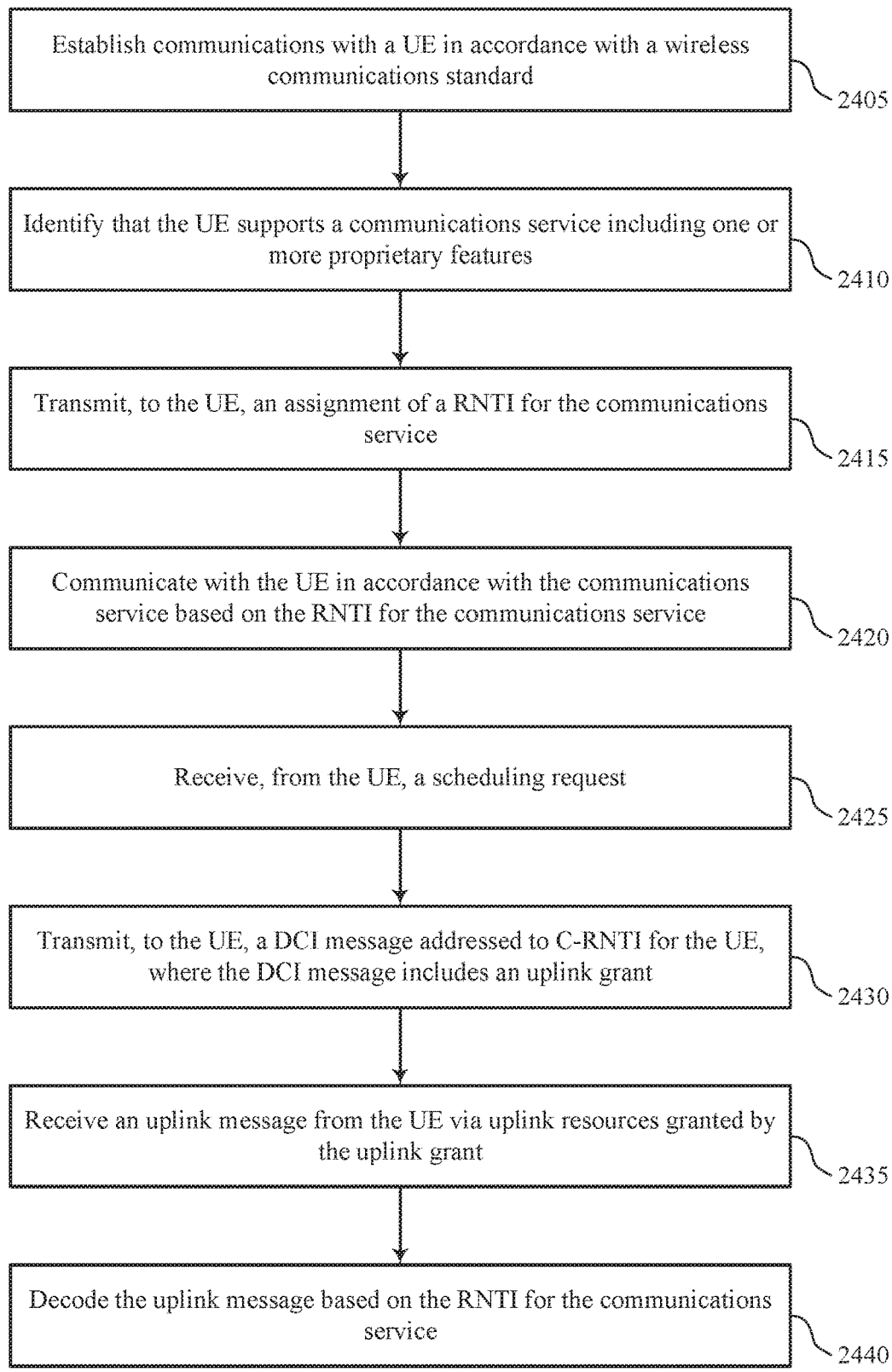

FIG. 24 shows a flowchart illustrating a method 2400 that supports proprietary features in wireless communications networks in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may establish communications with a UE in accordance with a wireless communications standard. The operations of 2405 may be performed according to the methods described herein. In some examples, aspects of the operations of 2405 may be performed by a standard features manager as described with reference to FIGS. 13 through 16.

At 2410, the base station may identify that the UE supports a communications service including one or more proprietary features. The operations of 2410 may be performed according to the methods described herein. In some examples, aspects of the operations of 2410 may be performed by a proprietary features manager as described with reference to FIGS. 13 through 16.

At 2415, the base station may transmit, to the UE, an assignment of a RNTI for the communications service. The operations of 2415 may be performed according to the methods described herein. In some examples, aspects of the operations of 2415 may be performed by a RNTI manager as described with reference to FIGS. 13 through 16.

At 2420, the base station may communicate with the UE in accordance with the communications service based on the RNTI for the communications service. The operations of 2420 may be performed according to the methods described herein. In some examples, aspects of the operations of 2420 may be performed by a proprietary features manager as described with reference to FIGS. 13 through 16.

At 2425, the base station may receive, from the UE, a scheduling request. The operations of 2425 may be performed according to the methods described herein. In some examples, aspects of the operations of 2425 may be performed by an uplink control manager as described with reference to FIGS. 13 through 16.

At 2430, the base station may transmit, to the UE, a DCI message addressed to a C-RNTI for the UE, where the DCI message includes an uplink grant. The operations of 2430 may be performed according to the methods described herein. In some examples, aspects of the operations of 2430 may be performed by a downlink control transmitter as described with reference to FIGS. 13 through 16.

At 2435, the base station may receive an uplink message from the UE via uplink resources granted by the uplink grant. The operations of 2435 may be performed according to the methods described herein. In some examples, aspects of the operations of 2435 may be performed by an uplink data receiver as described with reference to FIGS. 13 through 16.

At 2440, the base station may decode the uplink message based on the RNTI for the communications service. The operations of 2440 may be performed according to the methods described herein. In some examples, aspects of the operations of 2440 may be performed by a RNTI manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame tinting, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data strictures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting, to a network device and in accordance with a wireless communications standard, signaling that indicates the UE supports an additional communications service that comprises one or more features not supported by the wireless communications standard;
    receiving, from the network device, a message indicating an assignment of a radio network temporary identifier (RNTI) to the additional communications service supported by the UE, wherein an absence or presence of the RNTI in signaling indicates whether the signaling is in accordance with the wireless communications standard or in accordance with the additional communications service that comprises the one or more features not supported by the wireless communications standard;
    receiving, from the network device, a downlink control information (DCI) message addressed to the RNTI in accordance with the one or more features not supported by the wireless communications standard;
    attempting to decode the DCI message using a cell radio network temporary identifier (C-RNTI) for the UE;
    failing to decode the DCI message using the C-RNTI for the UE based at least in part on the DCI message not being encoded with the C-RNTI for the UE;
    decoding the DCI message using the RNTI assigned to the additional communications service based at least in part on the failed decoding attempt; and
    identifying that the DCI message is associated with the additional communications service based at least in part on a success of decoding the DCI message using the RNTI and the RNTI indicating that the signaling is in accordance with the additional communications service.

2. The method of claim 1, wherein at least one of a format or content of the DCI message comprises a feature that is non-compliant with the wireless communications standard.

3. The method of claim 1, further comprising:
    identifying a shared data channel resource based at least in part on the DCI message;
    receiving, from the network device, a downlink message via the shared data channel resource; and
    decoding the downlink message based at least in part on the RNTI that indicates that signaling is in accordance with the additional communications service.

4. The method of claim 3, wherein the downlink message comprises a downlink data transmission for the additional communications service.

5. The method of claim 3, wherein the downlink message comprises a media access control (MAC) control element (CE) or a radio resource control (RRC) message for the additional communications service, and wherein at least one of a format or content of the MAC CE or the RRC message comprises a feature not supported by the wireless communications standard.

6. The method of claim 1, further comprising:
receiving, from the network device, a grant of a semi-persistently scheduled (SPS) resource for the additional communications service;
receiving, from the network device, one or more downlink messages via the SPS resource; and
decoding the one or more downlink messages based at least in part on the RNTI that indicates that signaling is in accordance with the additional communications service.

7. The method of claim 6, wherein the one or more downlink messages comprise one or more downlink data transmissions for the additional communications service.

8. The method of claim 6, wherein the one or more downlink messages comprise at least one of a media access control (MAC) control element (CE) or a radio resource control (RRC) message, and wherein at least one of a format or content of the MAC CE or the RRC message comprises a feature not supported by the wireless communications standard.

9. The method of claim 1, further comprising:
receiving, from the network device, an indication of an uplink control channel resource that is reserved for the additional communications service; and
transmitting, to the network device via the uplink control channel resource, a scheduling request (SR) or other type of uplink control information (UCI) message associated with the additional communications service.

10. The method of claim 9, further comprising:
receiving, from the network device in response to transmitting the SR, an uplink grant addressed to the RNTI;
encoding an uplink message based at least in part on the RNTI that indicates that signaling is in accordance with the additional communications service; and
transmitting the uplink message to the network device via uplink resources granted by the uplink grant.

11. The method of claim 10, wherein the uplink message comprises an uplink data transmission for the additional communications service.

12. The method of claim 10, wherein the uplink message comprises a media access control (MAC) control element (CE) or a radio resource control (RRC) message, and wherein at least one of a format or content of the MAC CE or the RRC message comprises a feature not supported by the wireless communications standard.

13. The method of claim 9, wherein at least one of a format or content of the SR or the other type of UCI message comprises a feature not supported by the wireless communications standard.

14. The method of claim 1, further comprising:
receiving, from the network device, a configured grant of uplink resources for the additional communications service;
encoding one or more uplink messages based at least in part on the RNTI that indicates that signaling is in accordance with the additional communications service; and
transmitting the one or more uplink messages to the network device via the uplink resources associated with the configured grant.

15. The method of claim 14, wherein the one or more uplink messages comprise one or more uplink data transmissions for the additional communications service.

16. The method of claim 14, wherein the one or more uplink messages comprise at least one of a media access control (MAC) control element (CE) or a radio resource control (RRC) message, and wherein at least one of a format or content of the MAC CE or the RRC message comprises a feature not supported by the wireless communications standard.

17. The method of claim 1, further comprising:
transmitting, to the network device, a scheduling request (SR);
receiving, from the network device, a second DCI message addressed to the C-RNTI for the UE, wherein the second DCI message comprises an uplink grant;
encoding an uplink message based at least in part on the RNTI that indicates that signaling is in accordance with the additional communications service; and
transmitting the uplink message to the network device via uplink resources granted by the uplink grant.

18. The method of claim 1, further comprising:
receiving, from the network device, a configured grant of uplink resources; and
transmitting, to the network device, a plurality of uplink messages via the uplink resources associated with the configured grant, wherein at least a first uplink message of the plurality is encoded based at least in part on the C-RNTI for the UE and at least a second uplink message of the plurality is encoded based at least in part on the RNTI that indicates that signaling is in accordance with the additional communications service.

19. The method of claim 1, further comprising:
receiving, from the network device, an assignment of the C-RNTI, wherein the RNTI that indicates that signaling is in accordance with the additional communications service is distinct from the C-RNTI.

20. The method of claim 1, further comprising:
receiving, from the network device, an assignment of one or more additional RNTIs each corresponding to a respective communications service.

21. The method of claim 1, wherein transmitting the signaling that indicates the UE also supports the additional communications service comprising the one or more features not supported by the wireless communications standard comprises:
transmitting, to the network device, an indication of an identifier of the UE, capability information for the UE, or any combination thereof.

22. The method of claim 1, wherein the RNTI that indicates that signaling is in accordance with the additional communications service is specific to the UE.

23. The method of claim 1, wherein the RNTI that indicates that signaling is in accordance with the additional communications service is specific to the one or more features not supported by the wireless communications standard.

24. The method of claim 1, wherein the wireless communications standard is a third generation partnership project (3GPP) standard.

25. A method for wireless communication at a network device, comprising:
establishing communications with a user equipment (UE) in accordance with wireless communications standard;

identifying that the UE supports an additional communications service that comprises one or more features not supported by the wireless communications standard;

transmitting, for the UE, a message indicating an assignment of a radio network temporary identifier (RNTI) to the additional communications service supported by the UE, wherein an absence or a presence of the RNTI in signaling indicates whether the signaling is in accordance with the wireless communications standard or in accordance with the additional communications service that comprises the one or more features not supported by the wireless communications standard based at least in part on identifying that the UE supports the additional communications service;

receiving, from the UE, an uplink message addressed to the RNTI in accordance with the one or more features not supported by the wireless communications standard;

attempting to decode the uplink message using a cell radio network temporary identifier (C-RNTI) assigned to the UE;

failing to decode the uplink message using the C-RNTI based at least in part on the uplink message not being encoded with the C-RNTI;

decoding the uplink message using the RNTI assigned to the additional communications service based at least in part on the failed decoding attempt; and identifying that the uplink message is associated with the additional communications service based at least in part on a success of decoding the uplink message using the RNTI and the RNTI indicating that the signaling is in accordance with the additional communications service.

26. The method of claim 25, further comprising:
transmitting, for the UE, a downlink control information (DCI) message addressed to the RNTI.

27. The method of claim 26, wherein at least one of a format or content of the DCI message comprises a feature that is non-compliant with the wireless communications standard.

28. The method of claim 26, further comprising:
encoding a downlink message based at least in part on the RNTI that indicates that signaling is in accordance with the additional communications service; and
transmitting the downlink message for the UE via a shared data channel resource granted by the DCI message.

29. The method of claim 28, wherein the downlink message comprises a downlink data transmission for the additional communications service.

30. The method of claim 28, wherein the downlink message comprises a media access control (MAC) control element (CE) or a radio resource control (RRC) message based at least in part on the RNTI, and wherein at least one of a format or content of the MAC CE or the RRC message comprises a feature not supported by the wireless communications standard.

31. The method of claim 25, further comprising:
transmitting, for the UE, a grant of a semi-persistently scheduled (SPS) resource for the additional communications service;
encoding one or more downlink messages based at least in part on the RNTI that indicates that signaling is in accordance with the additional communications service; and
transmitting the one or more downlink messages to the UE via the SPS resource.

32. The method of claim 31, wherein the one or more downlink messages comprise one or more downlink data transmissions for the additional communications service.

33. The method of claim 31, wherein the one or more downlink messages comprise at least one of a media access control (MAC) control element (CE) or a radio resource control (RRC) message, and wherein at least one of a format or content of the MAC CE or the RRC message comprises a feature not supported by the wireless communications standard.

34. The method of claim 25, further comprising:
transmitting, for the UE, an indication of an uplink control channel resource that is reserved for the additional communications service; and
receiving, via the uplink control channel resource, a scheduling request (SR) or other type of uplink control information (UCI) message associated with the additional communications service.

35. The method of claim 34, further comprising:
transmitting, for the UE in response to receiving the SR, an uplink grant addressed to the RNTI; and
receiving the uplink message via uplink resources granted by the uplink grant.

36. The method of claim 35, wherein the uplink message comprises an uplink data transmission for the additional communications service.

37. The method of claim 35, wherein the uplink message comprises a media access control (MAC) control element (CE) or a radio resource control (RRC) message, and wherein at least one of a format or content of the MAC CE or the RRC message comprises a feature not supported by the wireless communications standard.

38. The method of claim 34, wherein at least one of a format or content of the SR or the other type of UCI message comprises a feature not supported by the wireless communications standard.

39. The method of claim 25, further comprising:
transmitting, for the UE, a configured grant of uplink resources for the additional communications service; and
receiving one or more uplink messages comprising the uplink message via the uplink resources associated with the configured grant.

40. The method of claim 39, wherein the one or more uplink messages comprise one or more uplink data transmissions for the additional communications service.

41. The method of claim 39, wherein the one or more uplink messages comprise at least one of a media access control (MAC) control element (CE) or a radio resource control (RRC) message, and wherein at least one of a format or content of the MAC CE or the RRC message comprises a feature not supported by the wireless communications standard.

42. The method of claim 25, further comprising:
receiving a scheduling request (SR);
transmitting, for the UE, a downlink control information (DCI) message addressed to the C-RNTI for the UE, wherein the DCI message comprises an uplink grant; and
receiving the uplink message via uplink resources granted by the uplink grant.

43. The method of claim 25, further comprising:
transmitting, for the UE, a configured grant of uplink resources;
receiving a plurality of uplink messages via the uplink resources associated with the configured grant;

decoding at least a first uplink message of the plurality based at least in part on the C-RNTI for the UE; and decoding at least a second uplink message of the plurality based at least in part on the RNTI that indicates that signaling is in accordance with the additional communications service.

44. The method of claim 43, further comprising:

attempting to decode each of the plurality of uplink messages based at least in part on the C-RNTI for the UE and based at least in part on the RNTI that indicates that signaling is in accordance with the additional communications service; and identifying at least the second uplink message as associated with the additional communications service based at least in part on successfully decoding the second uplink message based at least in part on the RNTI that indicates that signaling is in accordance with the additional communications service.

45. The method of claim 25, further comprising:

transmitting, for the UE, an assignment of the C-RNTI, wherein the RNTI that indicates that signaling is in accordance with the additional communications service is distinct from the C-RNTI.

46. The method of claim 25, further comprising:

transmitting, for the UE, an assignment of one or more additional RNTIs each corresponding to a respective communications service.

47. The method of claim 25, wherein identifying that the UE also supports the additional communications service comprising the one or more features not supported by the wireless communications standard comprises:

receiving an indication of an identifier of the UE; and determining, based at least in part on the identifier of the UE, that the UE supports the additional communications service.

48. The method of claim 25, wherein identifying that the UE also supports the additional communications service comprising the one or more features not supported by the wireless communications standard comprises:

receiving capability information indicating that the UE also supports the additional communications service.

49. The method of claim 25, wherein the RNTI that indicates that signaling is in accordance with the additional communications service is specific to the UE.

50. The method of claim 25, wherein the RNTI that indicates that signaling is in accordance with the additional communications service is specific to the one or more features not supported by the wireless communications standard.

51. An apparatus for wireless communication at a user equipment (UE), comprising:

a processor; and a memory coupled with the processor, with instructions stored in the memory, the instructions being executable by the processor to cause the apparatus to:

transmit, to a network device and in accordance with a wireless communications standard, signaling that indicates the UE supports an additional communications service that comprises one or more features not supported by the wireless communications standard;

receive, from the network device, a message indicating an assignment of a radio network temporary identifier (RNTI) to the additional communications service supported by the UE, wherein an absence or presence of the RNTI in signaling indicates whether the signaling is in accordance with the wireless communications standard or in accordance with the additional communications service that comprises the one or more features not supported by the wireless communications standard;

receive, from the network device, a downlink control information (DCI) message addressed to the RNTI in accordance with the one or more features not supported by the wireless communications standard;

attempt to decode the DCI message using a cell radio network temporary identifier (C-RNTI) for the UE;

fail to decode the DCI message using the C-RNTI for the UE based at least in part on the DCI message not being encoded with the C-RNTI for the UE;

decode the DCI message using the RNTI assigned to the additional communications service based at least in part on the failed decoding attempt; and identify that the DCI message is associated with the additional communications service based at least in part on a success of decoding the DCI message using the RNTI and the RNTI indicating that the signaling is in accordance with the additional communications service.

52. An apparatus for wireless communication at a network device, comprising:

a processor; and a memory coupled with the processor, with instructions stored in the memory, the instructions being executable by the processor to cause the apparatus to:

establish communications with a user equipment (UE) in accordance with a wireless communications standard;

identify that the UE supports an additional communications service that comprises one or more features not supported by the wireless communications standard;

transmit, for the UE, a message indicating an assignment of a radio network temporary identifier (RNTI) to the additional communications service supported by the UE, wherein an absence or a presence of the RNTI in signaling indicates whether the signaling is in accordance with the wireless communications standard or in accordance with the additional communications service that comprises the one or more features not supported by the wireless communications standard based at least in part on identifying that the UE supports the additional communications service;

receive, from the UE, an uplink message addressed to the RNTI in accordance with the one or more features not supported by the wireless communications standard;

attempt to decode the uplink message using a cell radio network temporary identifier (C-RNTI) assigned to the UE;

fail to decode the uplink message using the C-RNTI based at least in part on the uplink message not being encoded with the C-RNTI;

decode the uplink message using the RNTI assigned to the additional communications service based at least in part on the failed decoding attempt; and identify that the uplink message is associated with the additional communications service based at least in part on a success of decoding the uplink message using the RNTI and the RNTI indicating that the signaling is in accordance with the additional communications service.

* * * * *